US012740671B2

(12) United States Patent
Liao

(10) Patent No.: US 12,740,671 B2
(45) Date of Patent: *Sep. 22, 2026

(54) BATH STAND

(71) Applicant: Jian Chen, Taizhou City (CN)

(72) Inventor: Qihui Liao, Hunan Province (CN)

(73) Assignee: Jian Chen, Taizhou City (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/441,219

(22) Filed: Jan. 6, 2026

(65) Prior Publication Data

US 2026/0123795 A1 May 7, 2026

Related U.S. Application Data

(63) Continuation-in-part of application No. 19/206,461, filed on May 13, 2025, now Pat. No. 12,543,899.

(30) Foreign Application Priority Data

Jun. 19, 2024 (CN) ......................... 202421410082.2
Oct. 8, 2024 (CN) ......................... 202422423775.1

(51) Int. Cl.
*A47K 3/12* (2006.01)
*F16B 7/10* (2006.01)

(52) U.S. Cl.
CPC .............. *A47K 3/127* (2013.01); *F16B 7/105* (2013.01)

(58) Field of Classification Search
CPC ...................................................... A47K 3/127
USPC .......................................................... 4/572.1
See application file for complete search history.

(56) References Cited

U.S. PATENT DOCUMENTS

| | | | | |
|---|---|---|---|---|
| 7,058,995 B2 * | 6/2006 | Sundberg | A47K 3/127 4/572.1 |
| 12,226,056 B1 * | 2/2025 | Chen | A47K 3/127 |
| 12,543,899 B2 * | 2/2026 | Liao | A47K 3/127 |
| 2019/0174966 A1 * | 6/2019 | Murphy | A47K 3/127 |
| 2025/0339000 A1 * | 11/2025 | Ahn | A47K 3/127 |

FOREIGN PATENT DOCUMENTS

CN 118303778 A * 7/2024 ............ A47K 3/127

* cited by examiner

*Primary Examiner* — Huyen D Le

(57) ABSTRACT

The present invention provides a bath stand, which includes a base plate and a connecting base. The base plate includes a base plate main body and a base plate extension part; a base plate connection structure for connecting the base plate extension part to the base plate main body is arranged between the base plate extension part and the base plate main body. The connecting base is located above the base plate. A supporting assembly is arranged between the connecting base and the base plate to space the base plate apart from the connecting base vertically. A lower end of the supporting assembly is connected to the base plate; and an upper end of the supporting assembly is connected to the connecting base.

16 Claims, 35 Drawing Sheets

BATH STAND

CROSS-REFERENCE TO RELATED APPLICATIONS

This application is a continuation in part of U.S. application Ser. No. 19/206,461, filed on May 13, 2025, the content of which is incorporated by reference herein.

TECHNICAL FIELD

The present invention relates to the field of bath stands, and in particular, to a bath stand.

BACKGROUND

An existing bath stand is generally used to be placed horizontally in a bathtub for babies to lie down and avoid choking on water. When babies enter the peak period of gross motor development, those who have just learned to stand or have unstable standing may try to hold things to stand up. An adult cannot take a bath for a baby and supporting the baby at the same time with the hands. Even if the adult just turns around, the baby may easily fall over without the help and care of the adult.

Therefore, there is a need for a novel bath stand on the market that can help a baby stand up to be bathed. However, the existing bath stand has a narrow base, which cannot guarantee the safety and stability of the bath stand.

SUMMARY

A bath stand includes a base plate and a connecting base.

The base plate includes a base plate main body and a base plate extension part; a base plate connection structure for connecting the base plate extension part to the base plate main body is arranged between the base plate extension part and the base plate main body.

The connecting base is located above the base plate. A supporting assembly is arranged between the connecting base and the base plate to space the base plate apart from the connecting base vertically. A lower end of the supporting assembly is connected to the base plate; and an upper end of the supporting assembly is connected to the connecting base.

The present invention has the following beneficial effects. The present invention provides a bath stand, which includes a base plate and a connecting base. The base plate includes a base plate main body and a base plate extension part; a base plate connection structure for connecting the base plate extension part to the base plate main body is arranged between the base plate extension part and the base plate main body. The connecting base is located above the base plate. A supporting assembly is arranged between the connecting base and the base plate to space the base plate apart from the connecting base vertically. A lower end of the supporting assembly is connected to the base plate; and an upper end of the supporting assembly is connected to the connecting base. Since the base plate main body is connected with the base plate extension part through the base plate connection structure, a supporting area of the base plate is enlarged compared with a supporting area of an ordinary bath stand. The base plate extension part can ensure stable and reliable placement of the bath stand, thereby improving the safety of a baby during bathing.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
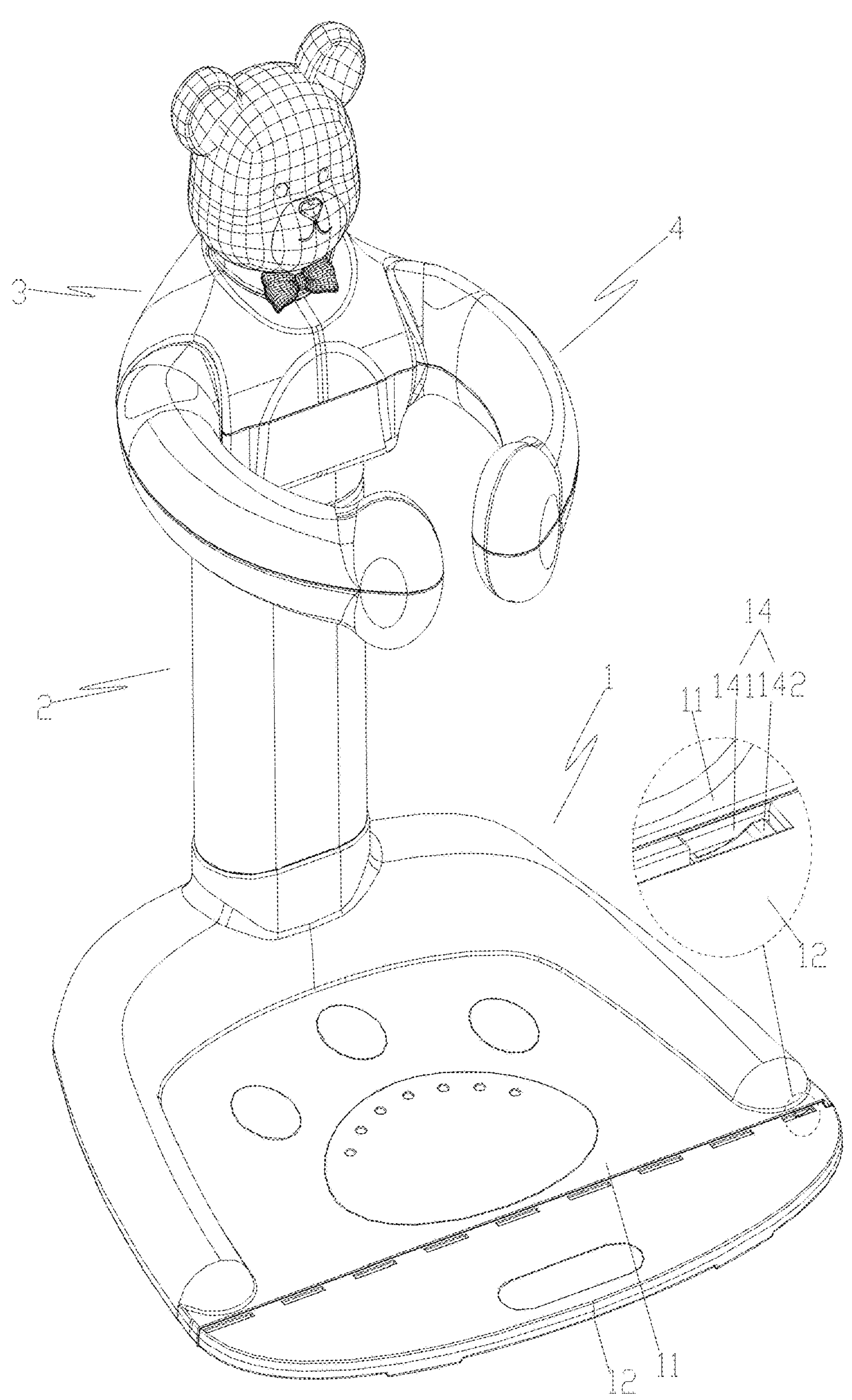
FIG. 1 is a three-dimensional diagram I according to Embodiment I of the present invention.
Figure 2:
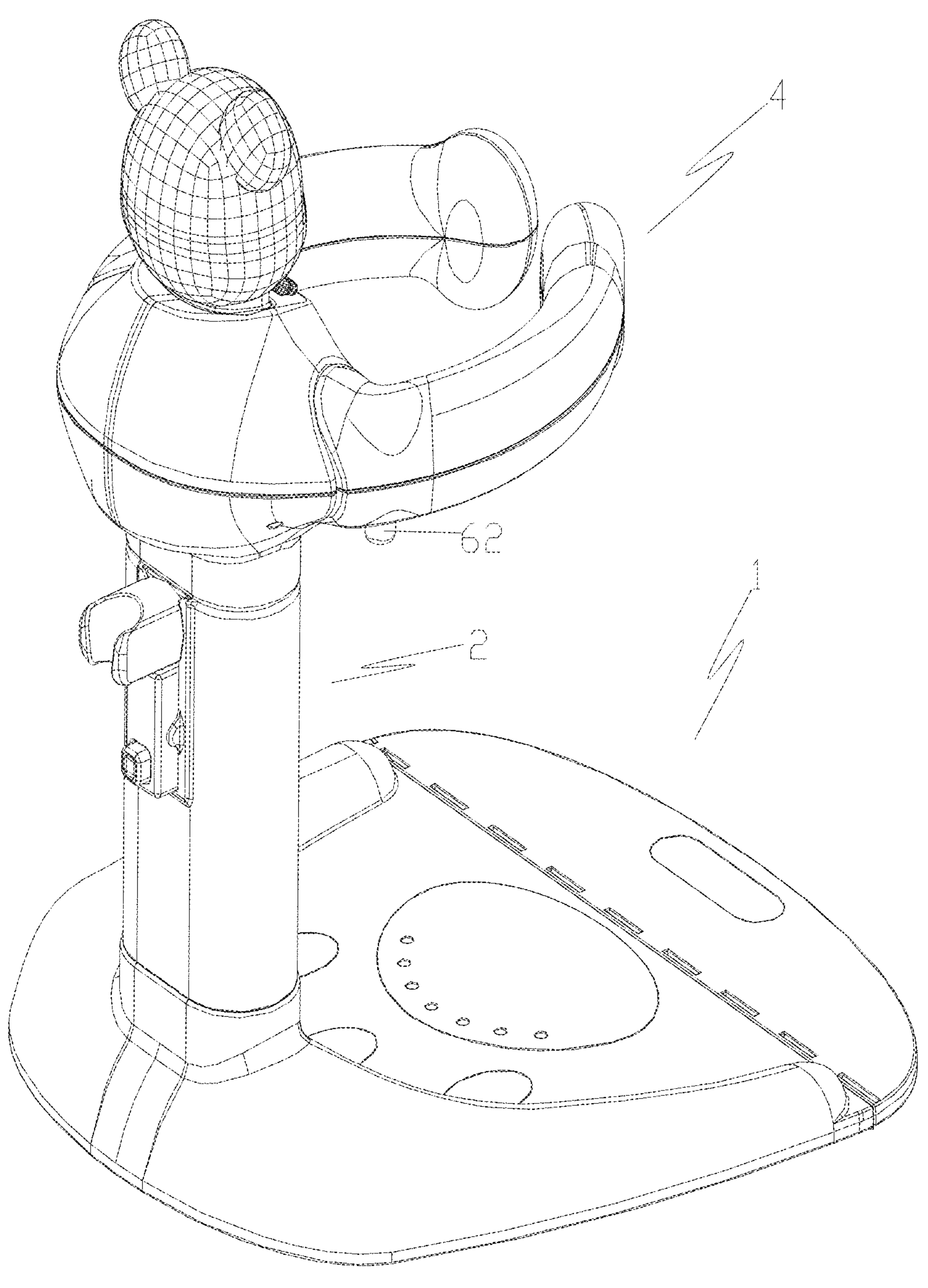
FIG. 2 is a three-dimensional diagram II according to Embodiment I of the present invention.
Figure 3:
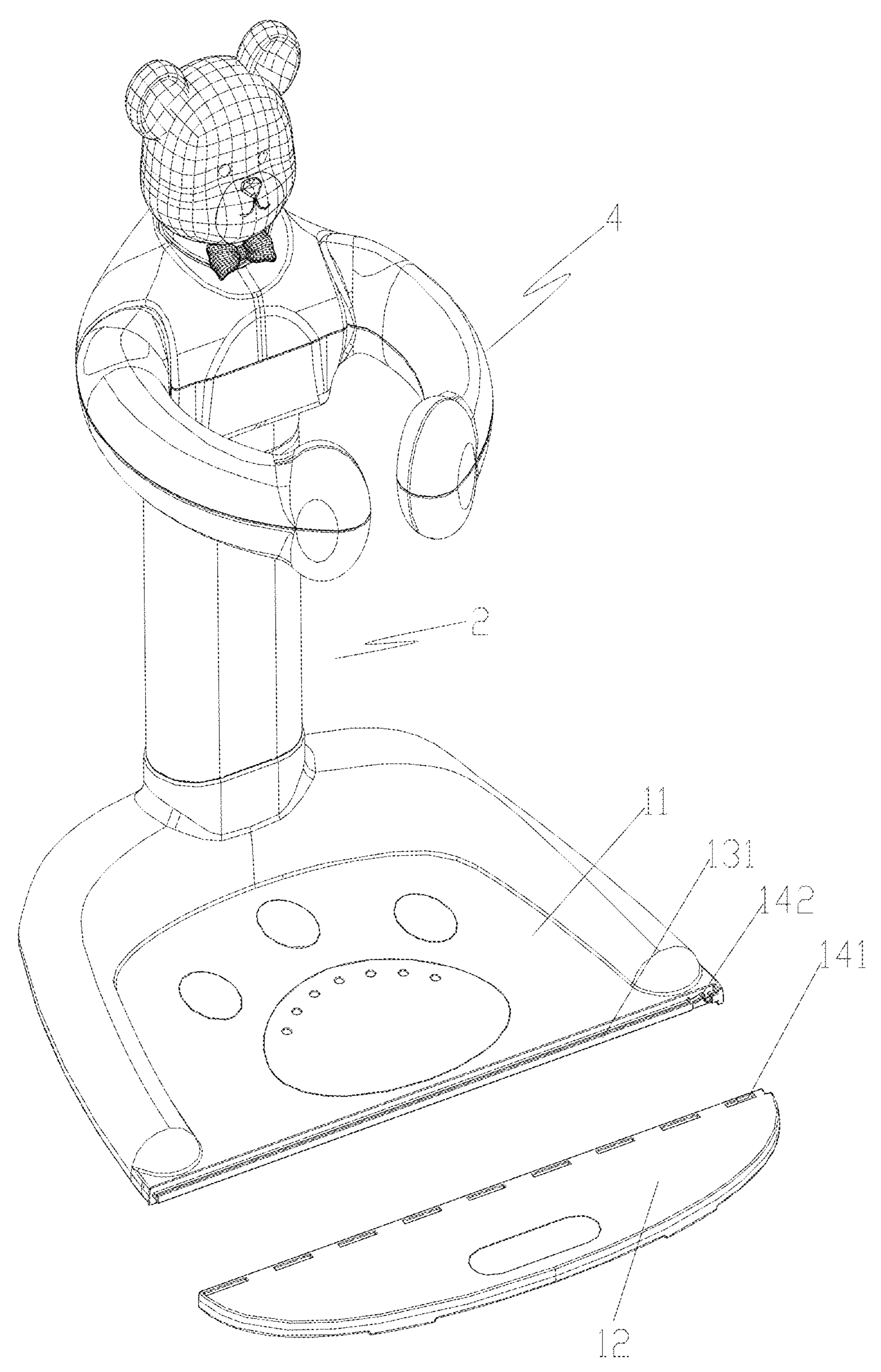
FIG. 3 is an exploded diagram I of a base plate connection structure according to Embodiment I of the present invention.
Figure 4:
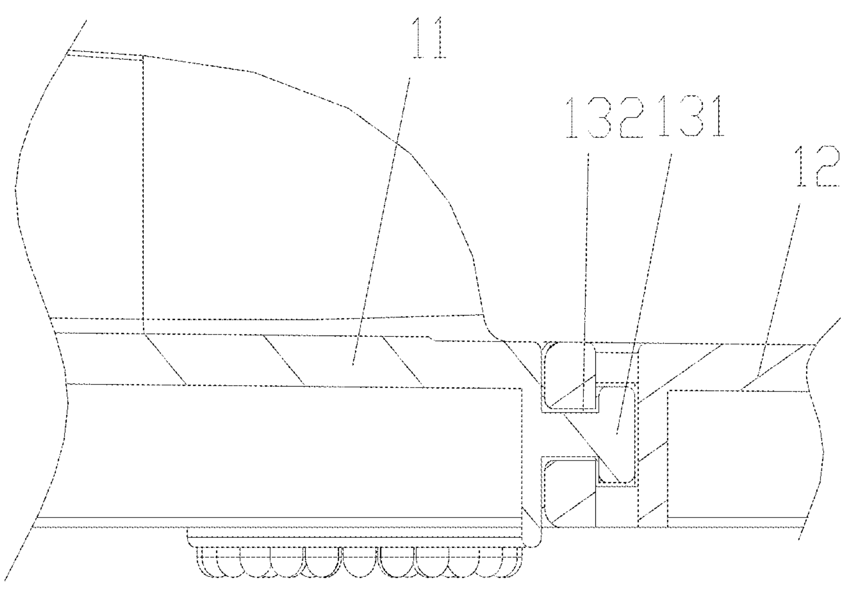
FIG. 4 is a cross-sectional view I of a base plate connection structure according to Embodiment I of the present invention.
Figure 5:
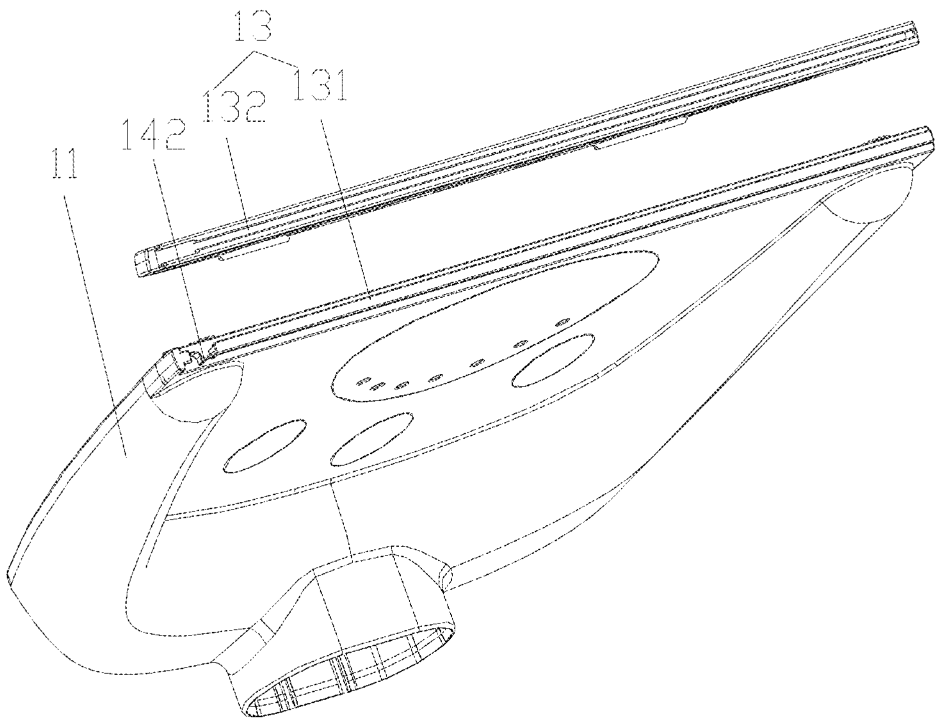
FIG. 5 is an exploded diagram II of a base plate connection structure according to Embodiment I of the present invention.
Figure 6:
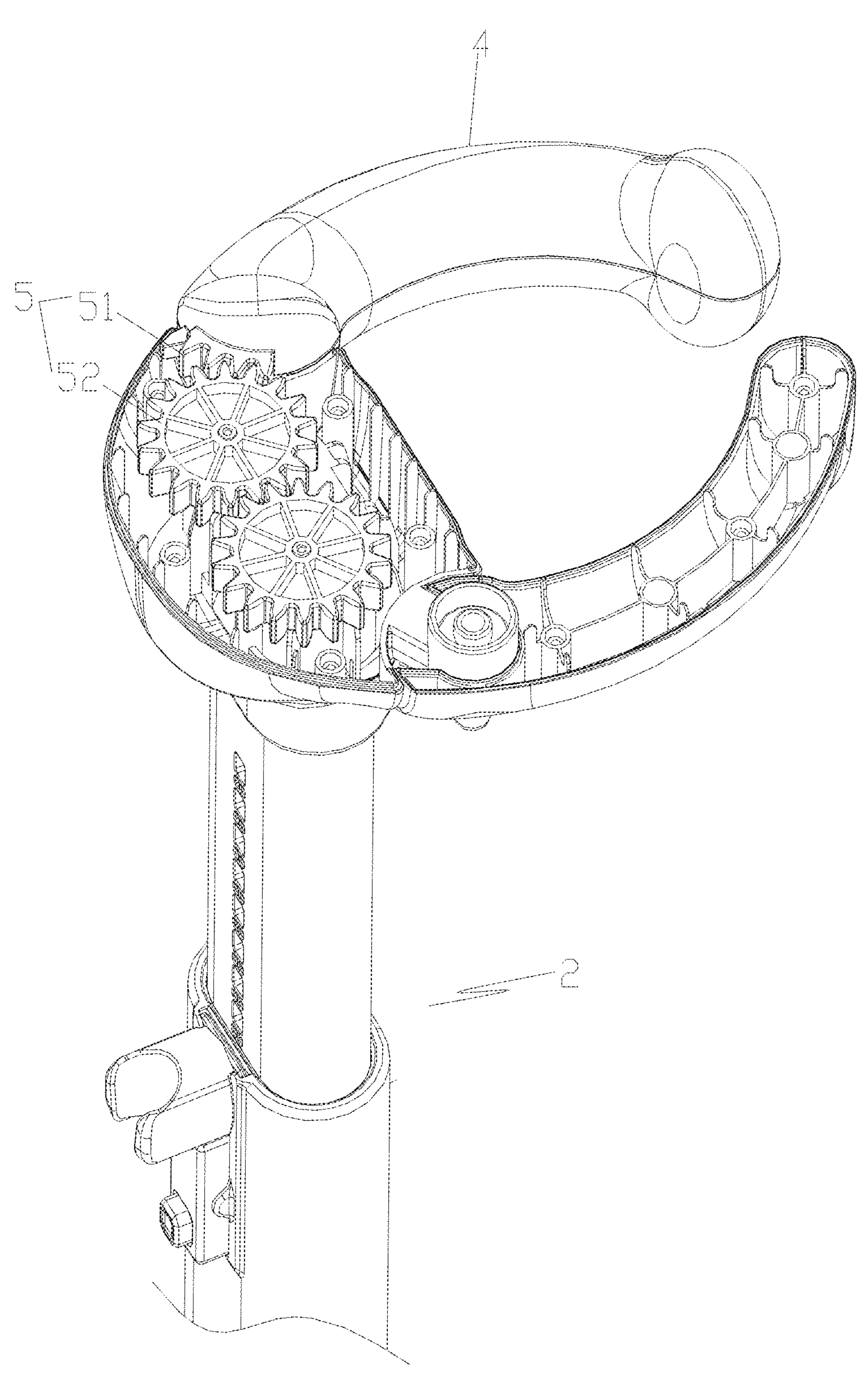
FIG. 6 is a schematic structural diagram of an armrest linkage mechanism according to Embodiment I of the present invention.
Figure 7:
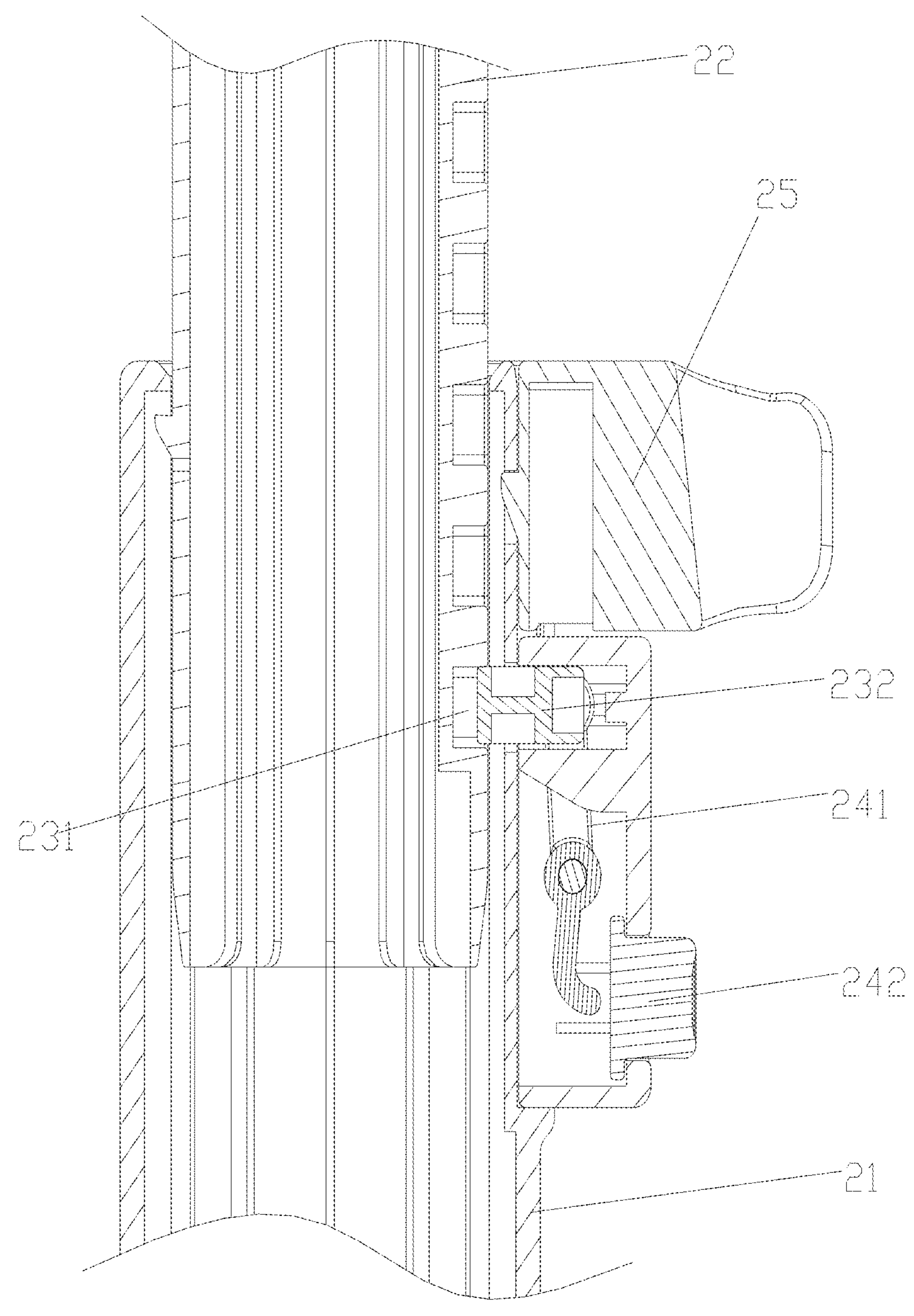
FIG. 7 is a cross-sectional view I of a supporting adjustment mechanism according to Embodiment I of the present invention.
Figure 8:
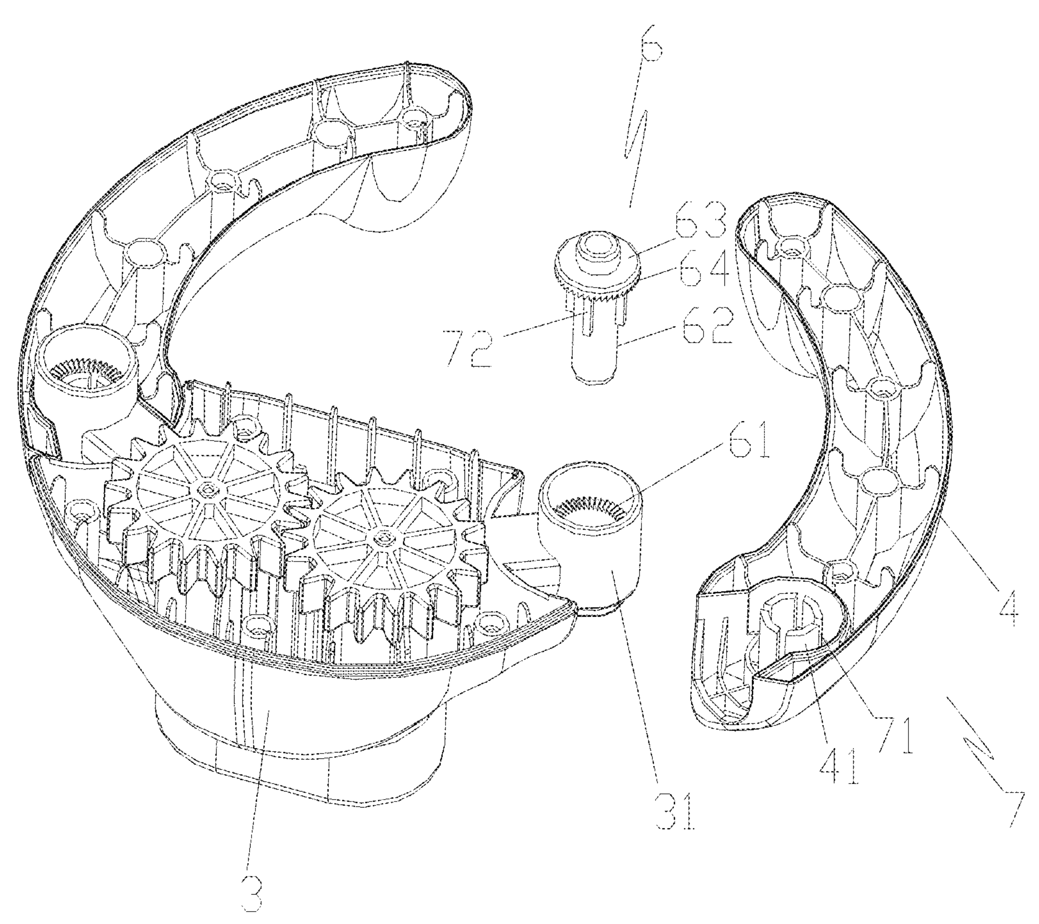
FIG. 8 is an exploded diagram I of an armrest locking mechanism according to Embodiment I of the present invention.
Figure 9:
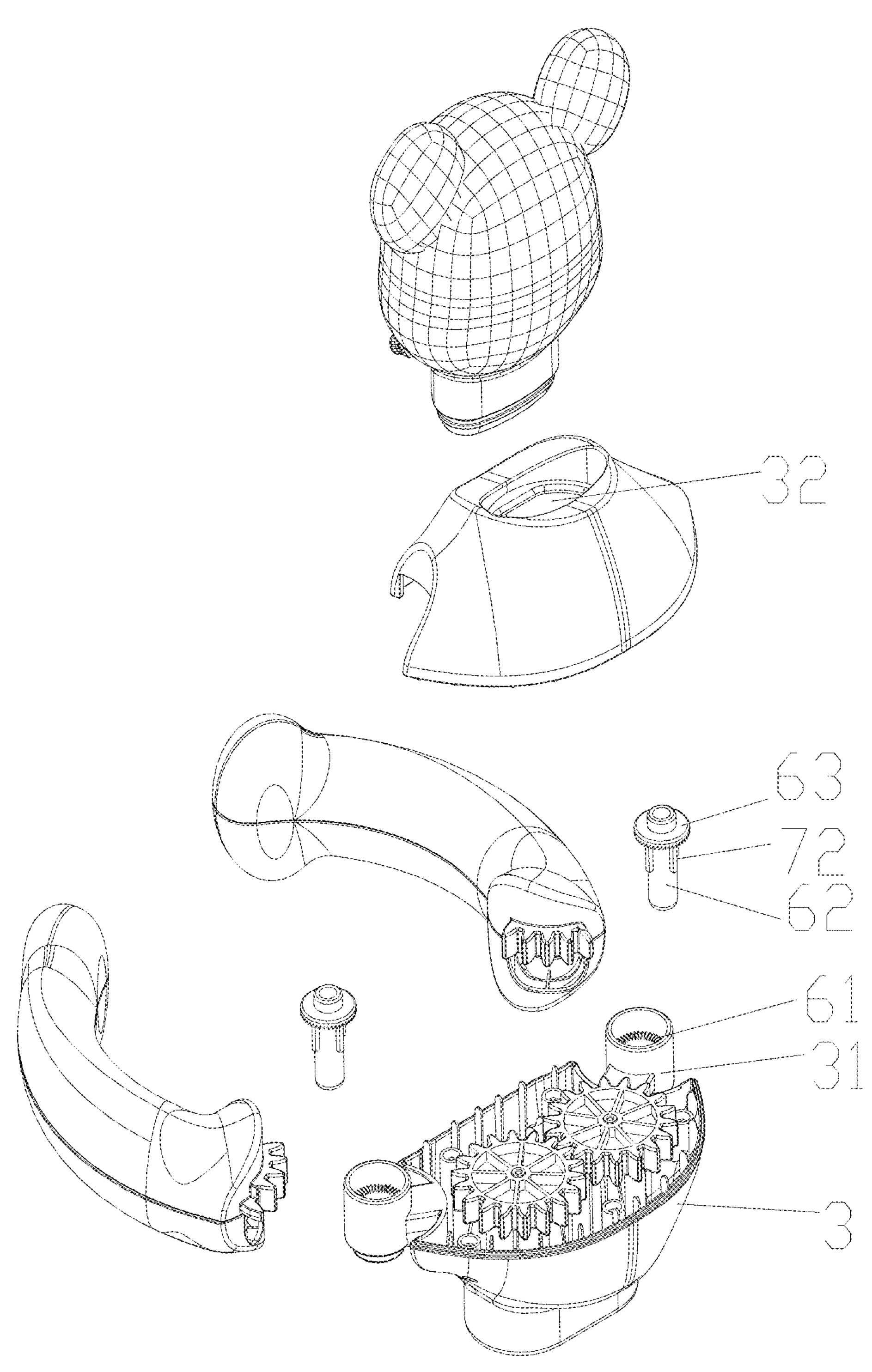
FIG. 9 is an exploded diagram II of an armrest locking mechanism according to Embodiment I of the present invention.
Figure 10:
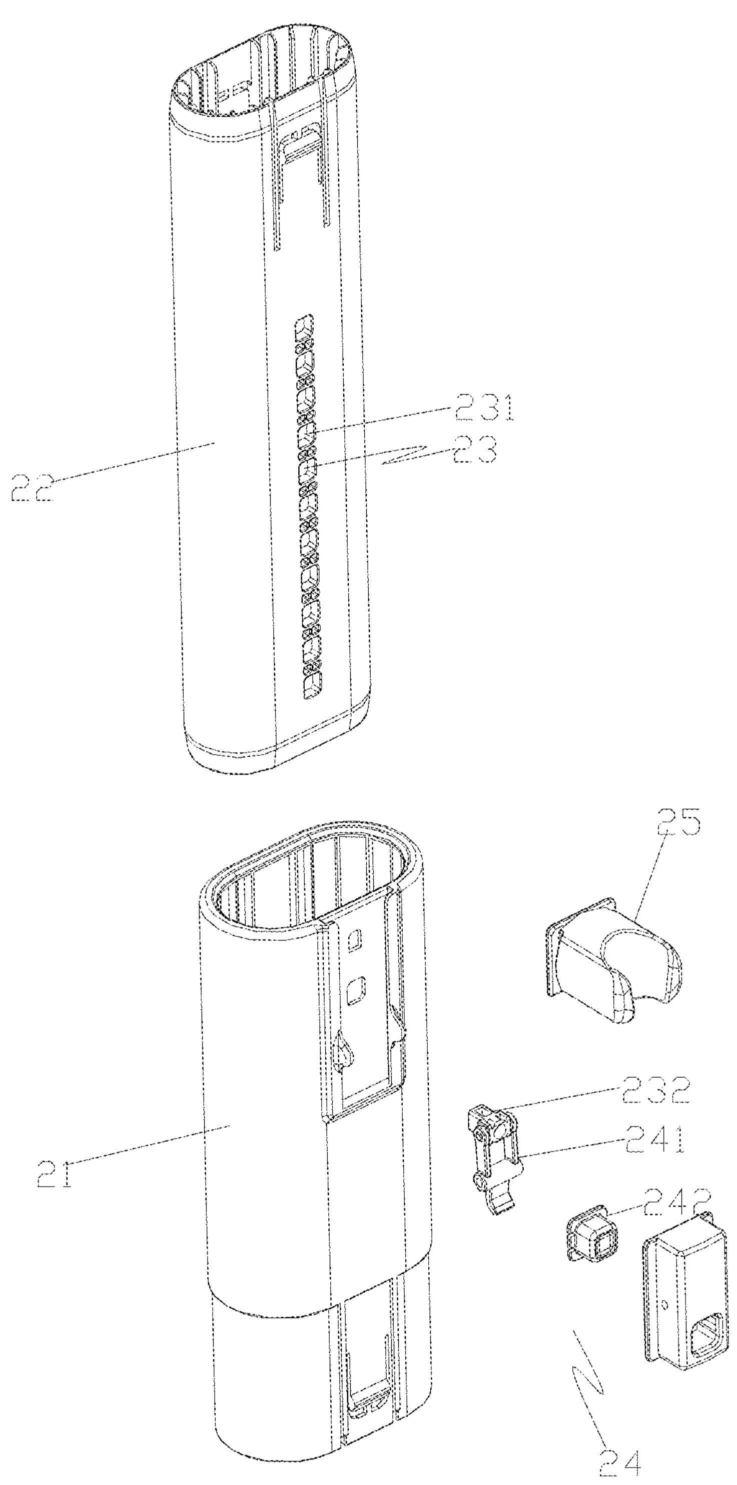
FIG. 10 is an exploded diagram of a supporting assembly according to Embodiment I of the present invention.
Figure 11:
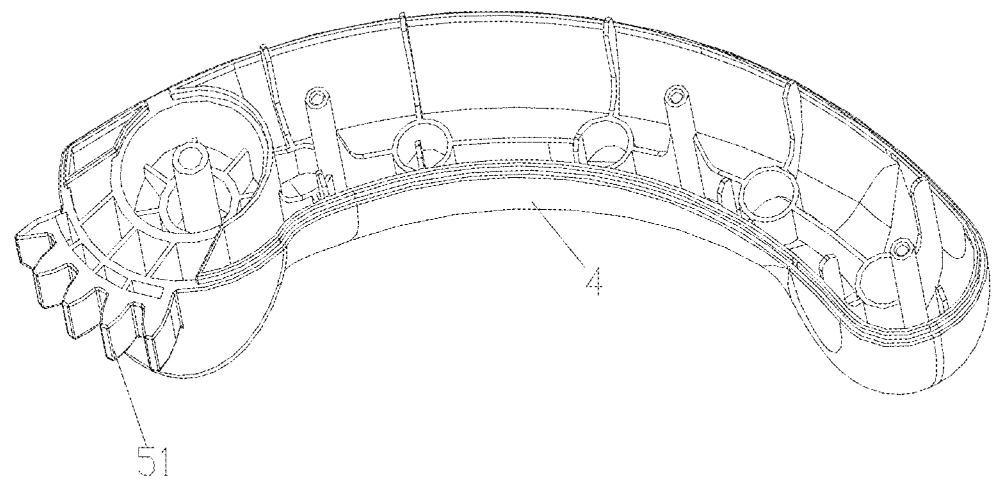
FIG. 11 is a partially schematic structural diagram of an armrest according to Embodiment I of the present invention.
Figure 12:
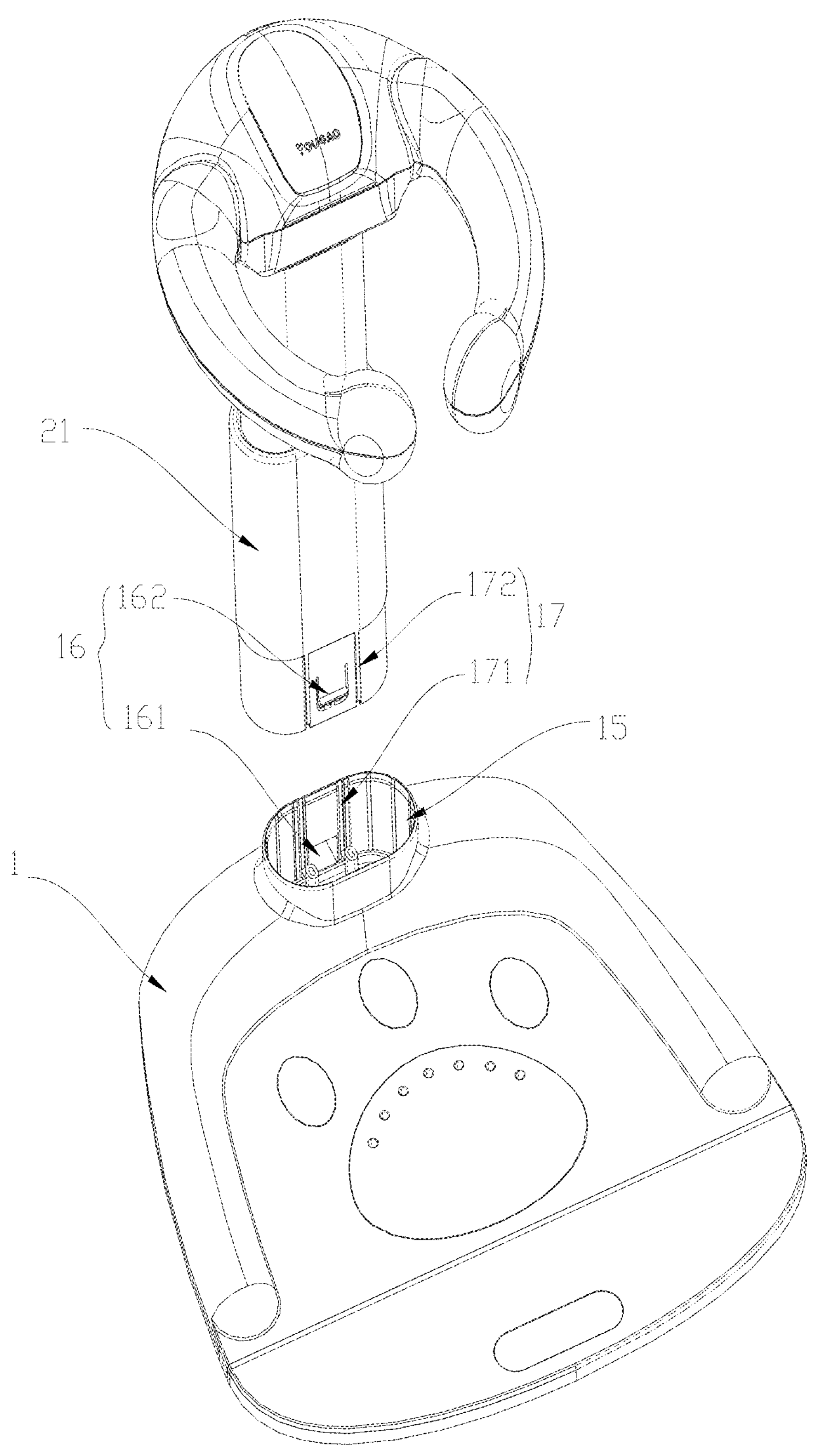
FIG. 12 is an exploded diagram of a base plate and a lower supporting rod according to Embodiment I of the present invention.
Figure 13:
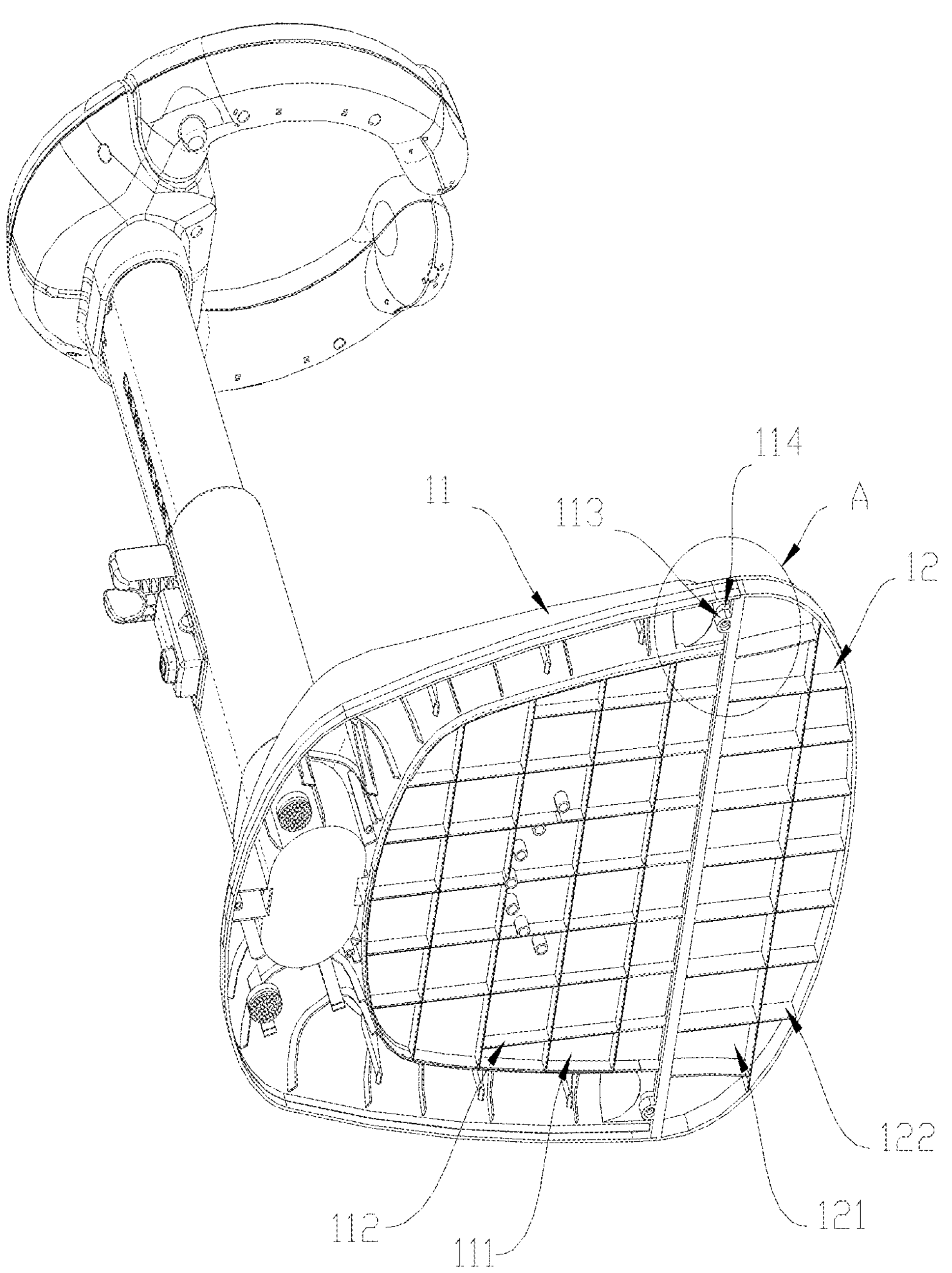
FIG. 13 is a schematic structural diagram of a bottom view according to Embodiment II of the present invention.
Figure 14:
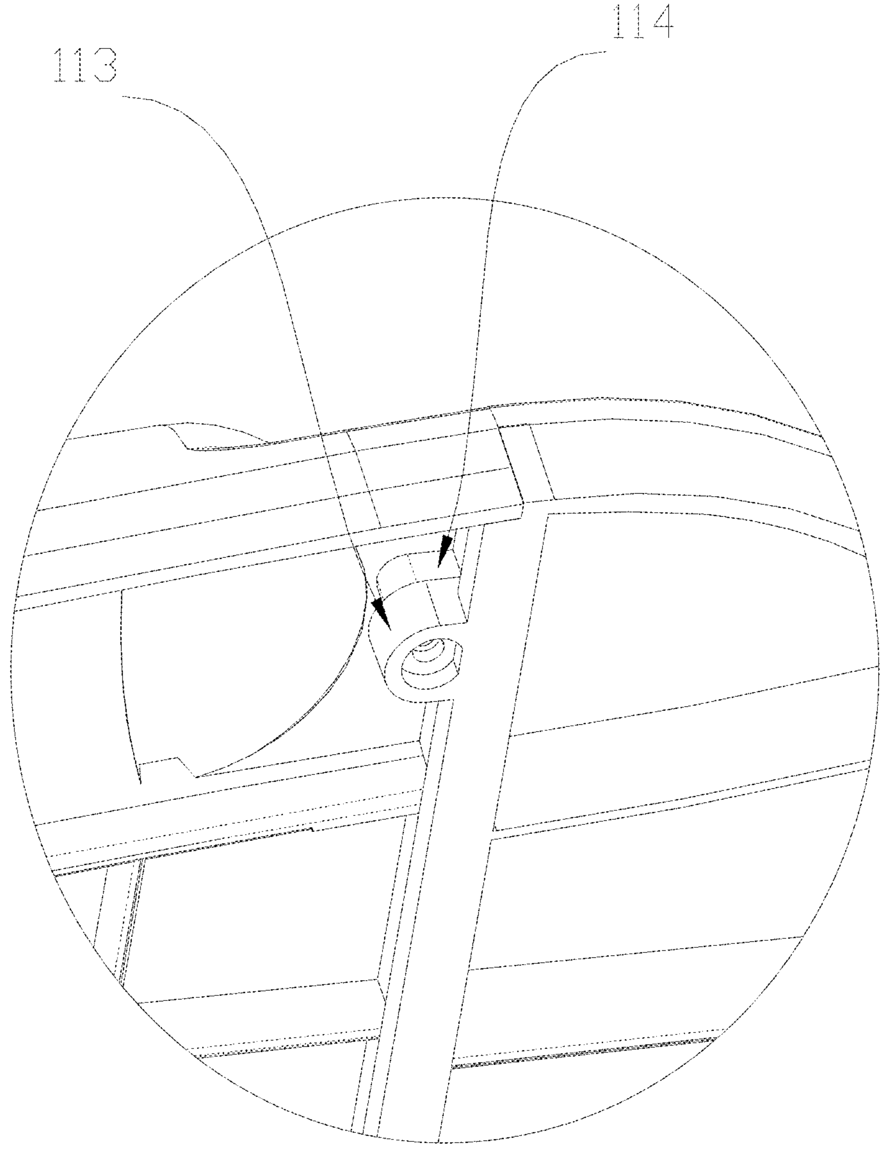
FIG. 14 is an enlarged view of part A in FIG. 13.
Figure 15:
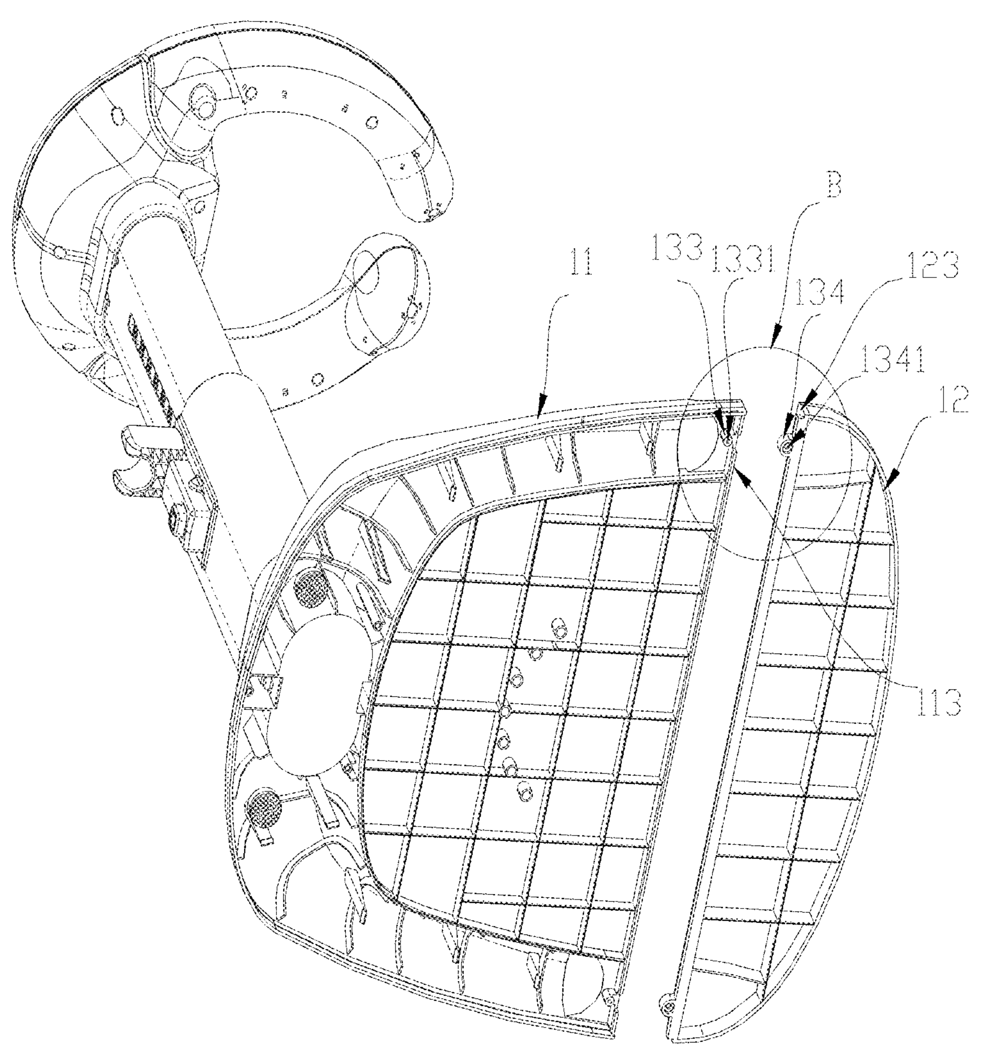
FIG. 15 is an exploded diagram of a base plate main body and a base plate extension part according to Embodiment II of the present invention.
Figure 16:
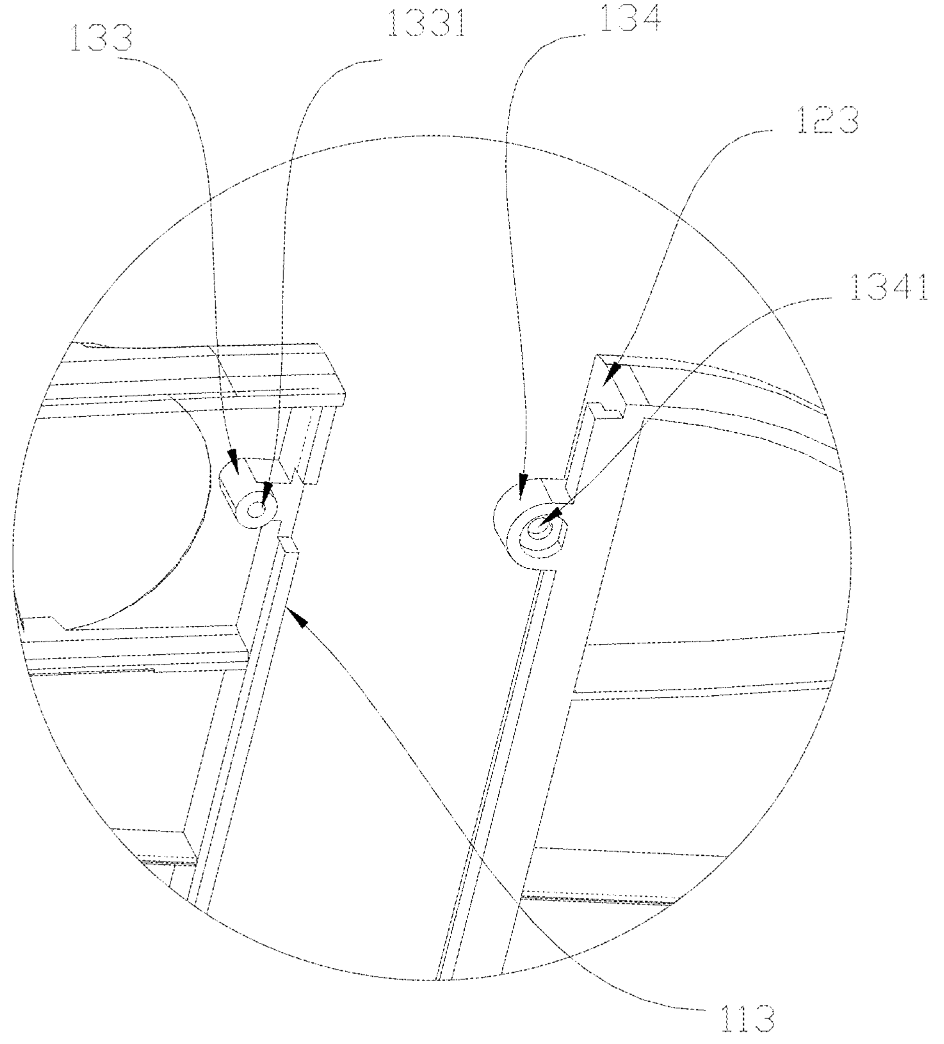
FIG. 16 is an enlarged diagram of part B in FIG. 15.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term “comprising” when utilized, means “including, but not necessarily limited to”; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to “an” or “one” embodiment in this disclosure are not necessarily to the same embodiment, and such references can mean “at least one”. In addition, the terms “first” and “second” are used for descriptive purposes only and cannot be understood as indicating or implying relative importance or implying the number of indicated technical features. Thus, the features defined as “first” and “second” may explicitly or implicitly include one or more of the features. In the description of embodiments of the application, “a plurality of” means two or more, unless otherwise specifically defined.

Embodiment I

Referring to FIG. 1 to FIG. 13, a bath stand includes:

a base plate 1, wherein the base plate 1 includes a base plate main body 11 and a base plate extension part 12; a base plate connection structure 13 for connecting the base plate extension part 12 to the base plate main body 11 is arranged between the base plate extension part 12 and the base plate main body 11; and a connecting base 3, wherein the connecting base 3 is located above the base plate 1; a supporting assembly 2 is arranged between the connecting base 3 and the base plate 1 to space the base plate 1 apart from the connecting base 3 vertically; a lower end of the supporting assembly 2 is connected to the base plate 1; and an upper end of the supporting assembly 2 is connected to the connecting base 3.

Through the above structure, since the base plate main body 11 is connected with the base plate extension part 12 through the base plate connection structure 13, a supporting area of the base plate 1 is enlarged compared with a supporting area of an ordinary bath stand. The base plate extension part 12 can ensure stable and reliable placement of the bath stand, thereby improving the safety of a baby during bathing.

In this embodiment, the lower end of the supporting assembly 2 is detachably connected to the base plate 1, and the upper end of the supporting assembly 2 is detachably connected to the connecting base 3. Through the above structure, since the supporting assembly 2 is detachably connected to the base plate 1 and the connecting base 3, in a process of transportation, packaging, and the like, the overall volume can be reduced, and packaging costs and space occupation can be reduced.

In this embodiment, the bath stand further includes two armrests 4. Corresponding end portions of the armrests 4 are connected to the connecting base 3. The corresponding end portions of the armrests 4 are rotatably connected to the connecting base 3. The two armrests 4 can move towards each other to be closed or move away from each other to be opened relative to the connecting base 3. Through the above structure, the two armrests 4 are rotatably connected to the connecting base 3. The two armrests 4 can simultaneously move towards each other to be closed or move away from each other to be opened, to adjust a distance between the two armrests 4. That is, when one armrest 4 can be operated to be rotatably opened or closed, the other armrest 4 can be linked to be correspondingly rotatably opened or closed to meet needs of babies with different body types. The bath stand has characteristics of high practicability and convenience of use and operation.

In this embodiment, the base plate main body 11 has a first hollow slot 111 in a bottom. A first reinforcing rib 112 is arranged inside the first hollow slot 111. The base plate extension part 12 has a second hollow slot 121 in a bottom. A second reinforcing rib 122 is arranged inside the second hollow slot 121. Through the above structure, since the base plate main body 11 and the base plate extension part 12 both have the hollow slots and the reinforcing ribs, the overall weight and production costs can be reduced, and it can ensure the safety and stability of the base plate main body 11 and the base plate extension part 12.

In this embodiment, the base plate connection structure 13 is configured to detachably connect the base plate extension part 12 with the base plate main body 11. Through the above structure, by removing the base plate extension part 12 from the base plate main body 11, the base plate extension part 12 and the base plate main body 11 can be separated and individually packaged or stacked with each other during delivery packaging, to minimize the overall volume of the base plate 1 before packaging, which is convenient for packaging, transportation, and selling.

Specifically, in this embodiment, the base plate connection structure 13 includes a base plate insertion protrusion 131 arranged on the base plate main body 11 or the base plate extension part 12, and a base plate insertion recess 132 that is correspondingly arranged on the base plate extension part 12 or the base plate main body 11 and is in insertion fit with the base plate insertion protrusion 131. A limiting and stop structure 7 for preventing separation of the protrusion from the recess is arranged between the base plate insertion recess 132 and the base plate insertion protrusion 131.

Further, a cross section of the base plate insertion protrusion 131 and a cross section of the base plate insertion recess 132 are T-shaped structures that adapt to each other. Through the above structure, during mounting and removal, by only operating the base plate extension part 12 to move left or right in a width direction of the base plate main body 11, the base plate insertion recess 132 and the base plate insertion protrusion 131 can be inserted or separated, which facilitates mounting and removal. One end of the base plate insertion recess 132 is opened, and the other end is closed. A base plate closing bulge that is matched with the open end of the base plate insertion recess 132 is arranged at a corresponding end portion of the base plate insertion protrusion 131. Meanwhile, the base plate closing bulge is matched with the open end of the base plate insertion recess 132 to further play a positioning role, which ensures in-place mounting and accurate mounting.

Further, in order to improve the stability and firmness of connection between the base plate main body 11 and the base plate extension part 12, the limiting and stop structure 7 includes a blocking locking hole 141 provided in the base plate insertion protrusion 131 or the base plate insertion recess 132, and a blocking lock piece 142 that is elastically correspondingly arranged on the base plate insertion recess 132 or the base plate insertion protrusion 131 and is configured to be in locking fit with the blocking locking hole 141 when the base plate insertion protrusion 131 is in insertion fit with the base plate insertion recess 132.

Through the above structure, during mounting and removal, by only operating the base plate extension part 12 to move left or right in a width direction of the base plate main body 11, the base plate insertion recess 132 and the base plate insertion protrusion 131 can be inserted or separated, which facilitates mounting and removal. One end of the base plate insertion recess 132 is opened, and the other end is closed. A base plate closing bulge that is matched with the open end of the base plate insertion recess 132 is arranged at a corresponding end portion of the base plate insertion protrusion 131. Meanwhile, the base plate closing bulge is matched with the open end of the base plate insertion recess 132 to further play a positioning role, which ensures in-place mounting and accurate mounting.

In this embodiment, the connecting base 3 is provided with an armrest linkage mechanism 5 for connecting the two armrests 4 in a linkage manner. An armrest locking mechanism 6 for locking the armrest 4 relative to the connecting base 3 is arranged between at least one of the armrests 4 and the connecting base 3. Through the above structure, the armrests 4 are rotatably connected to the connecting base 3, and the two armrests 4 are connected to each other in the linkage manner through the armrest linkage mechanism 5. The two armrests 4 can simultaneously move towards each other to be closed or move away from each other to be opened, to adjust a distance between the two armrests 4. That is, when one armrest 4 can be operated to be rotatably opened or closed, the other armrest 4 can be linked to be correspondingly rotatably opened or closed to meet needs of babies with different body types. The bath stand has characteristics of high practicability and convenience of use and operation. If only one group of armrest locking mechanism 6 is required to cooperate with the armrest linkage mechanism 5 to lock the two armrests 4 relative to the connecting base 3, the group of armrest locking mechanism 6 is operated to be unlocked to release a locked state of the two armrests 4 relative to the connecting base 3, which facilitates locking and unlocking.

In this embodiment, in order to adjust the armrests 4 more accurately to ensure that a distance between the two armrests 4 is more in line with a body type of a baby, the armrest locking mechanism 6 is configured to allow the armrests 4 to be adjusted in a plurality of angles relative to the connecting base 3.

In this embodiment, for ease of assembling and disassembling and stable and reliable rotation, the connecting base 3 is provided with an outer connecting cylinder 31. An inner connecting cylinder 41 that is rotatably inserted into the outer connecting cylinder 31 is arranged at a corresponding end portion of the armrest 4.

In this embodiment, in order to better lock the armrest 4, the armrest locking mechanism 6 includes armrest locking grooves 61 provided in an inner side of the outer connecting cylinder 31 in a circumferential spacing manner, and an armrest locking sliding rod 62 that is threaded into the inner connecting cylinder 41 in a manner of sliding up and down. An armrest locking convex ring 63 is arranged at an upper part of the armrest locking sliding rod 62. Armrest locking convex teeth 64 that are in locking fit with the armrest locking grooves 61 are arranged on a lower surface of the armrest locking convex ring 63 in a circumferential spacing manner. The armrest locking mechanism 6 further includes a sliding rod reset elastic member for driving the armrest locking sliding rod 62 to be elastically reset. Through the above structure, during adjustment, a user presses a lower end of the armrest locking sliding rod 62 to upwards slide the armrest locking sliding rod 62 relative to the armrest 4, causing the armrest locking convex teeth 64 to be separated from the armrest locking grooves 61. Then, the armrest 4 is operated to rotate inwards or outwards relative to the connecting base 3. When the armrest 4 is rotated to a desired angle, the pressure on the lower end of the armrest locking sliding rod 62 is released. In this case, the armrest locking sliding rod 62 slides downwards to be reset relative to the armrest 4 under an elastic action of the sliding rod reset elastic member, so that the armrest locking convex teeth 64 and the armrest locking grooves 61 are clamped and locked.

In this embodiment, in order to prevent the armrest locking sliding rod 62 from being rotated relative to the armrest 4, a limiting and stop structure 7 for preventing rotation of the armrest locking sliding rod 62 is arranged between an outer wall of the armrest locking sliding rod 62 and a side wall of the inner connecting cylinder 41. The limiting and stop structure 7 includes a stop and limiting slot 71 arranged on the side wall of the inner connecting cylinder 41, and a stop and limiting block 72 arranged on the outer wall of the armrest locking sliding rod 62 and threaded in the stop and limiting slot 71. Through the above structure, by stop cooperation between the stop and limiting block 72 and the stop and limiting slot 71, a sliding path of the armrest locking sliding rod 62, which ensures that the armrest locking convex teeth 64 are accurately aligned with the armrest locking grooves 61 for locking fit. In addition, the armrest locking sliding rod 62 can also be rotated with the armrest 4 relative to the connecting base 3, to achieve angle adjustment locking. A positioning hole is provided in an upper end of the armrest locking sliding rod 62, and a positioning rod threaded into the positioning hole is arranged on an upper shell of the armrest 4, to play a guide role and make the armrest locking sliding rod 62 slide more smoothly. In this case, an upper end of the armrest locking sliding rod 62 is connected to the upper shell of the armrest 4, and a lower end of the armrest locking sliding rod 62 is connected to a lower shell of the armrest 4, which can enable connection and locking between the armrest 4 and the connecting base 3 through the armrest locking sliding rod 62 to be more stable and more reliable.

In this embodiment, the armrest linkage mechanism 5 includes armrest teeth 51 respectively arranged at the corresponding end portions of two armrests 4, and a linkage gear 52 that is rotatably arranged on the connecting base 3 and is in meshing drive with the armrest teeth 51. Through the above structure, a gear drive structure has the characteristics of compact structure, high linkage efficiency, quick response, and long service life, which better ensures synchronous rotation of the two armrests 4. In this embodiment, the connecting base 3 is provided with two linkage gears 52 for drive fit, as shown in the figure, which effectively reduces the volume because of use of a single linkage gear 52 and reduces manufacturing costs.

In this embodiment, in order to meet needs of babies with different heights, the supporting assembly 2 includes a lower supporting rod 21, a lower end of which is detachably connected to the base plate 1, and an upper supporting rod 22, a lower end of which is connected to the lower supporting rod 21 in a telescopically adjustable manner. An upper end of the upper supporting rod 22 is detachably connected to the connecting base 3. An adjustment locking mechanism 23 and an adjustment unlocking mechanism 24 for linking an unlocking action of the adjustment locking mechanism 23 are arranged between the upper supporting rod 22 and the lower supporting rod 21. The supporting assembly 2 is detachably connected to the base plate 1 and the connecting base 3 respectively, so that the base plate 1, the supporting assembly 2, and the connecting base 3 can be separated and individually packaged or stacked with each other during delivery packaging, to minimize the overall volume of the bath stand before packaging, which is convenient for packaging, transportation, and selling.

The lower end of the supporting assembly 2 is detachably connected to one end of the base plate main body 11 away from the base plate extension part 12.

In this embodiment, in order to better adjust and lock the upper supporting rod 22 relative to the lower supporting rod 21, the adjustment locking mechanism 23 includes a plurality of adjustment locking holes 231 that are provided in the upper supporting rod 22 and are spaced apart in a length direction of the upper supporting rod, and an adjustment locking block 232 that is slidably arranged on the lower supporting rod 21 and can be inserted into the corresponding adjustment locking holes 231 to lock the upper supporting rod 22 relative to the lower supporting rod 21. A locking block reset elastic member for driving the adjustment locking block 232 to be elastically reset is arranged between the adjustment locking block 232 and the lower supporting rod 21. The adjustment locking block 232 is configured to be linked with an unlocking action by the adjustment unlocking mechanism 24.

In this embodiment, for ease of unlocking and labor saving, the adjustment unlocking mechanism 24 includes an adjustment unlocking rod 241, a middle part of which is rotatably connected to the lower supporting rod 21. An upper end of the adjustment unlocking rod 241 is rotatably connected to the adjustment locking block 232. The adjustment unlocking mechanism 24 further includes an adjustment unlocking button 242 that is slidably arranged on the lower supporting rod 21 and can press a lower end of the adjustment unlocking rod 241. Through the above structure, during adjustment, a user presses the adjustment unlocking button 242 to cause an inner end of the adjustment unlocking button 242 to press the lower end of the adjustment unlocking rod 241, thereby causing a lower part of the adjustment unlocking rod 241 to rotate towards one side of the lower supporting rod 21 around a rotation axis between the adjustment unlocking rod 241 and the lower supporting rod 21, and causing an upper part of the adjustment unlocking rod 241 to rotate away from one side of the lower supporting rod 21 around the rotation axis between the adjustment unlocking rod 241 and the lower supporting rod 21. Then, the upper end of the adjustment unlocking rod 241 drives the adjustment locking block 232 to slide away from one side of the upper supporting rod 22 and exit the adjustment locking hole 231. Then, the upper supporting rod 22 is operated to extend upwards to be reset or retract downwards to be reset relative to the lower supporting rod. When the upper supporting rod 22 is adjusted to a desired position, an acting force on the adjustment unlocking button 242 is released. In this case, the adjustment locking block 232 slides towards one side of the adjustment locking hole 231 to be inserted into the adjustment locking hole 231 under an elastic force of the locking block reset elastic member. In the sliding reset process of the adjustment locking block 232, the adjustment unlocking rod 241 and the adjustment unlocking button 242 are driven to be correspondingly reset by the adjustment locking block 232.

In this embodiment, for ease of mounting an external object such as a shower head, a mounting buckle 25 is detachably connected to the lower supporting rod 21.

In this embodiment, for ease of use and replacement of different types of children toys, the connecting base 3 is provided with an external insertion port 32 for inserting and positioning a children toy.

In order to reduce the impact of the armrests 4 on the skin of a baby and provide a comfortable supporting region for the baby, protective gloves sleeve the armrests 4. The protective gloves may be made of a material such as silicone, sponge, and a cloth cover.

In order to increase a friction force on an upper surface of the base plate 1 and facilitate stable and reliable supporting for the feet of a baby, a friction layer for increasing the friction force is arranged on an upper surface of the base plate 1.

In order to improve the structural strength and reliability of the base plate 1, a U-shaped base plate reinforcing rod is arranged on the upper surface of the base plate 1, and the lower end of the supporting assembly 2 is connected to the base plate reinforcing rod. A lower insertion hole 15 is provided in the base plate reinforcing rod.

Embodiment II

Referring to FIG. 13 to FIG. 16, this embodiment provides a bath stand with a structure that is basically consistent with the structure in Embodiment I. A difference lies in the base plate connection structure 13.

Specifically, in this embodiment, the base plate main body 11 has a first connection surface 113 connected to the base plate extension part 12. The base plate extension part 12 has a second connection surface 123 connected to the first connection surface 113. The base plate connection structure 13 includes a first mounting member 133 that is arranged on the first connection surface 113 or the second connection surface 123 and protrudes outwards. The first mounting member 133 has a first mounting hole 1331. The base plate connection structure 13 further includes a second mounting member 134 that is arranged on the second connection surface 123 or the first connection surface 113 and faces inwards. The second mounting member 134 has a second mounting hole 1341. The first connection surface 113 or the second connection surface 123 is provided with a third mounting hole 1131 corresponding to the second mounting hole 1341. The first mounting member 133 can pass through the third mounting hole 1131 and is in matched connection with the second mounting member 134, to cause a screw to pass through the second mounting hole 1341 and the first mounting hole 1331 to detachably lock the base plate extension part 12 to the base plate main body 11.

Through the above structure, when the first connection surface 113 of the base plate main body 11 and the second connection surface 123 of the base plate extension part 12 are oppositely spliced, the first mounting member 133 can pass through the third mounting hole 1131, and the first mounting member 133 and the second mounting member 134 can be connected in a manner of being stacked up and down, so that the first mounting hole 1331 is communicated with the second mounting hole 1341. In this case, when the screw is threaded through the first mounting hole 1331 and the second mounting hole 1341, the base plate extension part 12 can be fixed on the base plate main body. The structural design is convenient and simple. It is convenient for removal and mounting, and the mounting efficiency is improved.

Embodiment III

Figure 17:
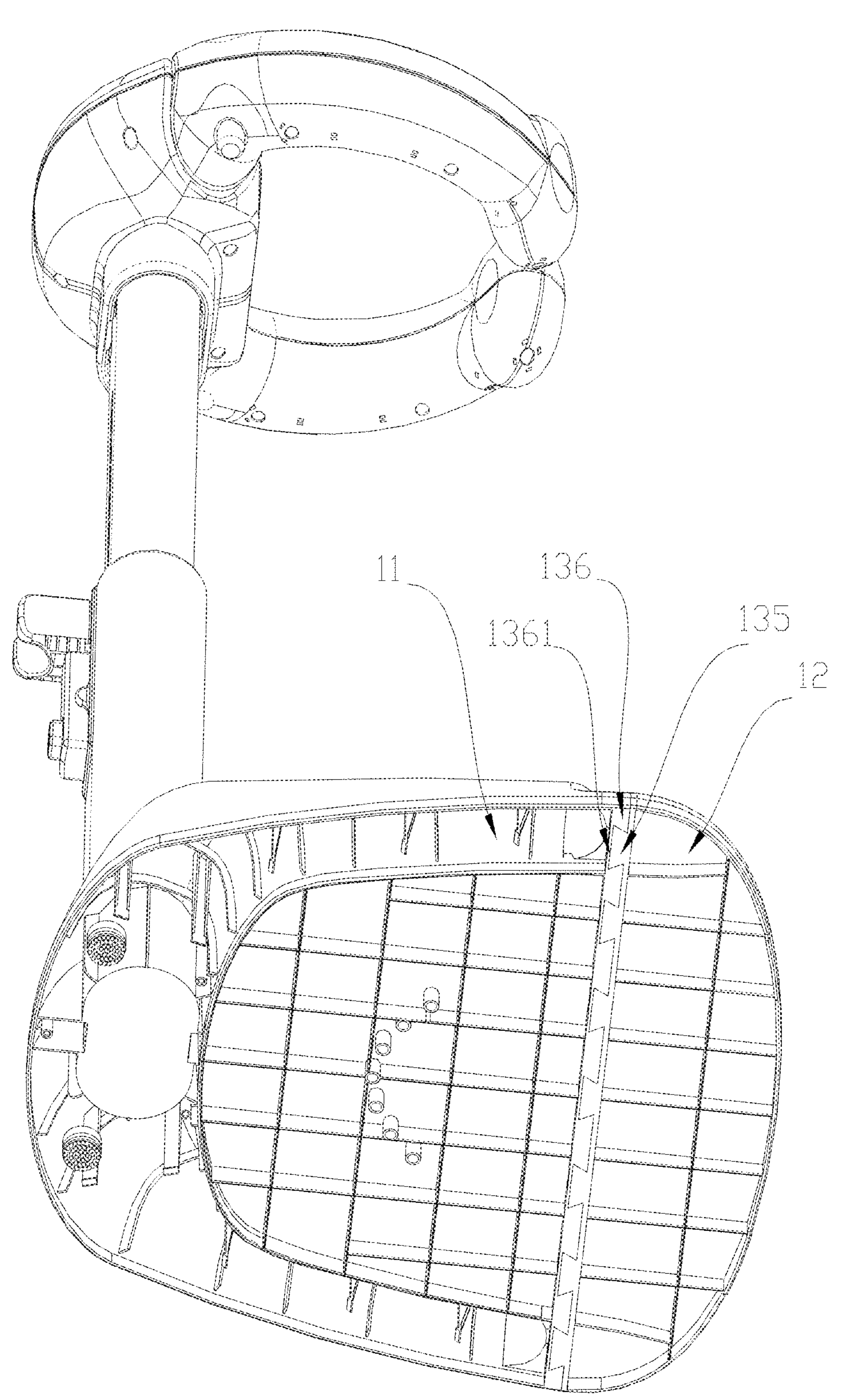
FIG. 17 is a schematic structural diagram of a bottom view according to Embodiment III of the present invention.
Figure 18:
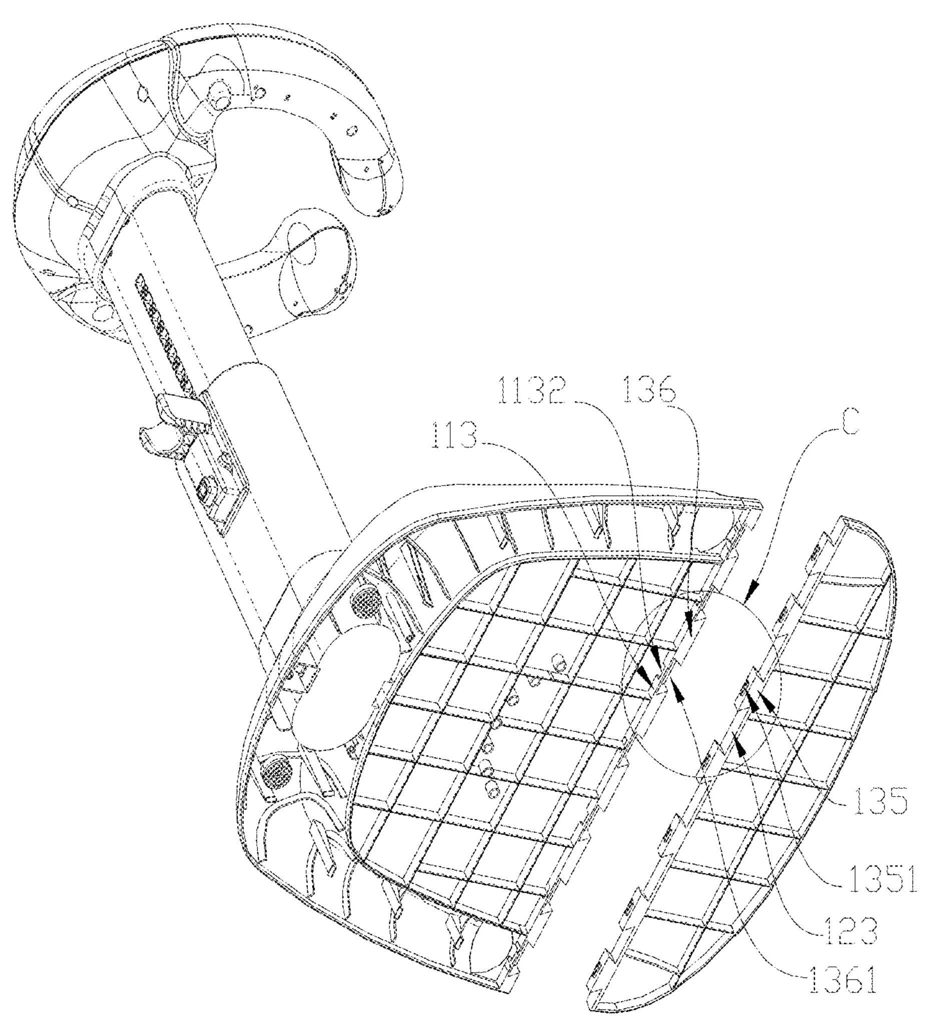
FIG. 18 is an exploded diagram of a base plate main body and a base plate extension part according to Embodiment III of the present invention.
Figure 19:
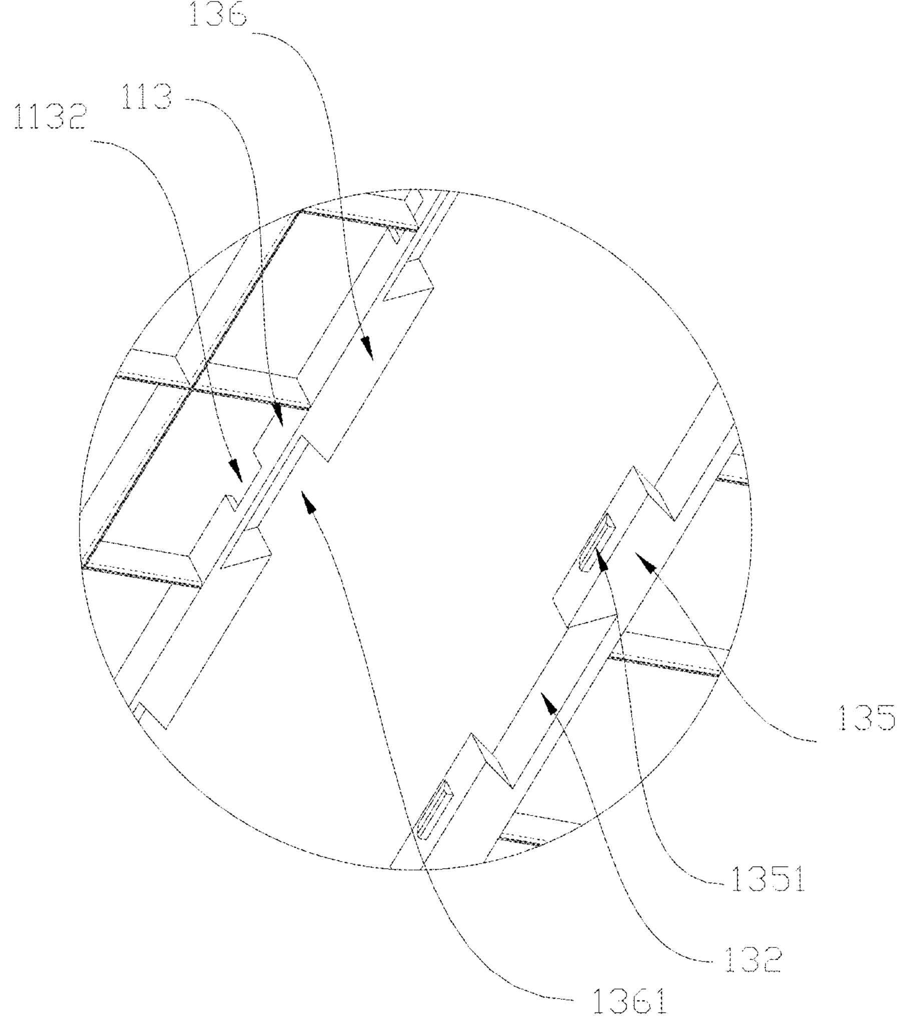
FIG. 19 is an enlarged view of part C in FIG. 18.
Figure 20:
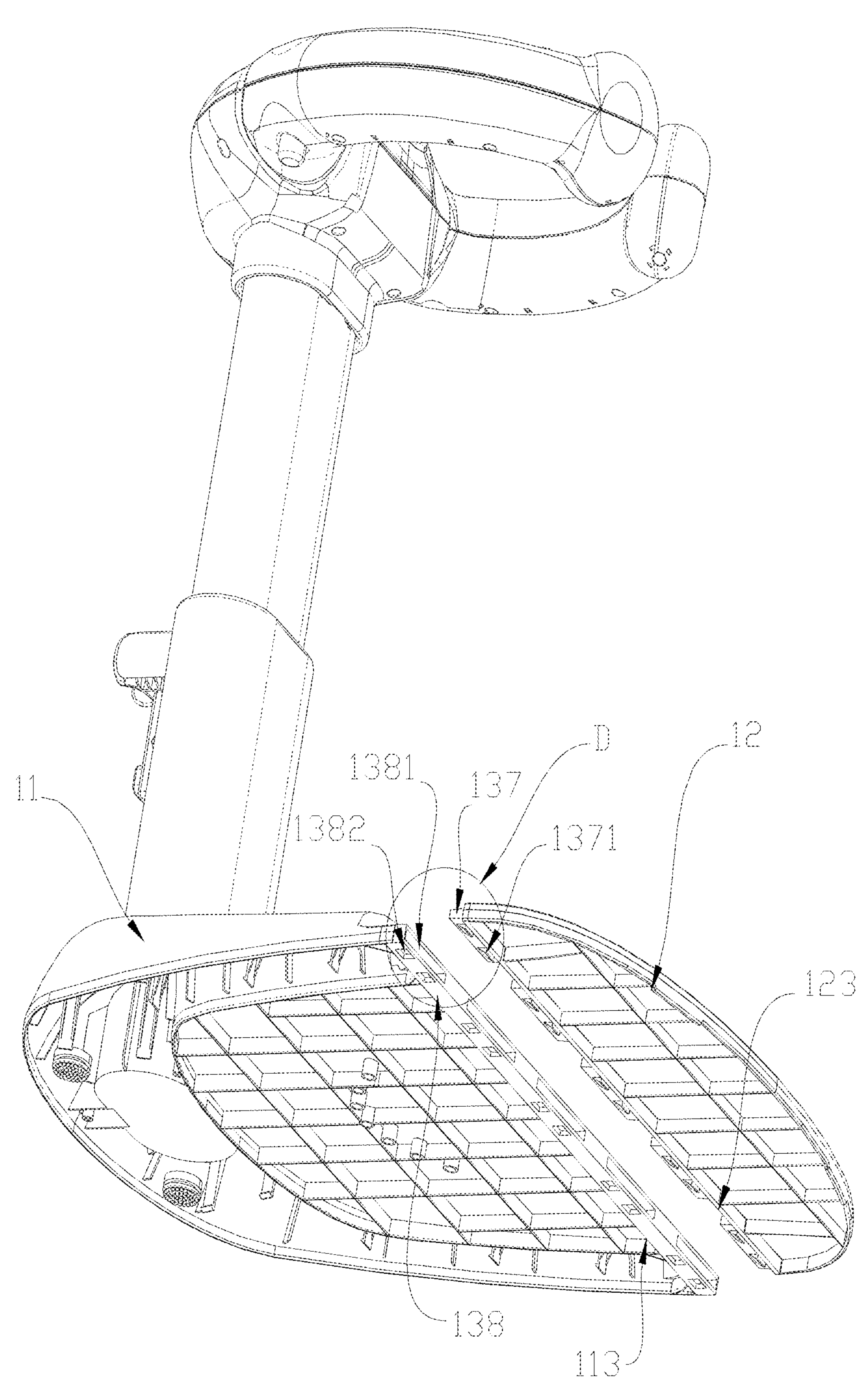
FIG. 20 is an exploded diagram of a base plate main body and a base plate extension part according to Embodiment IV of the present invention.
Figure 21:
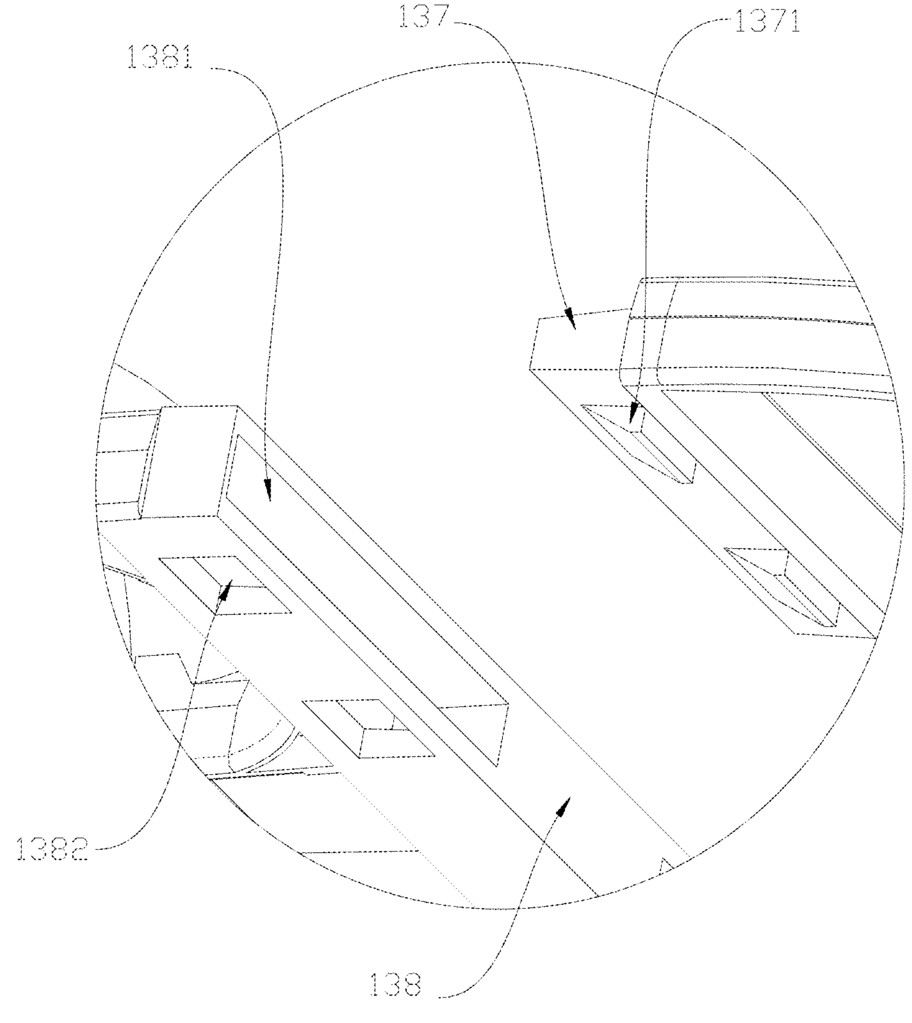
FIG. 21 is an enlarged view of part D in FIG. 20.
Figure 22:
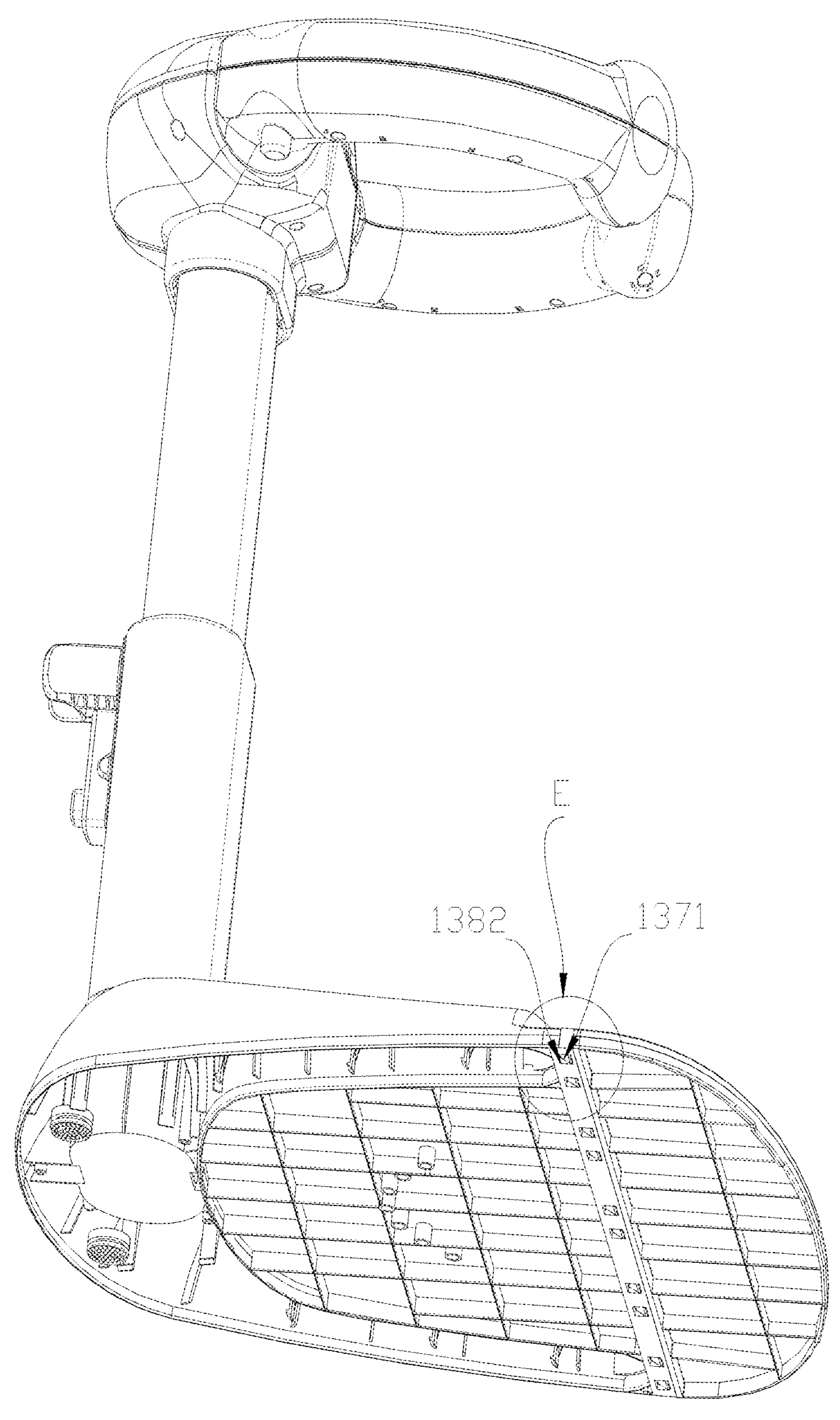
FIG. 22 is a schematic structural diagram of a bottom view according to Embodiment IV of the present invention.
Figure 23:
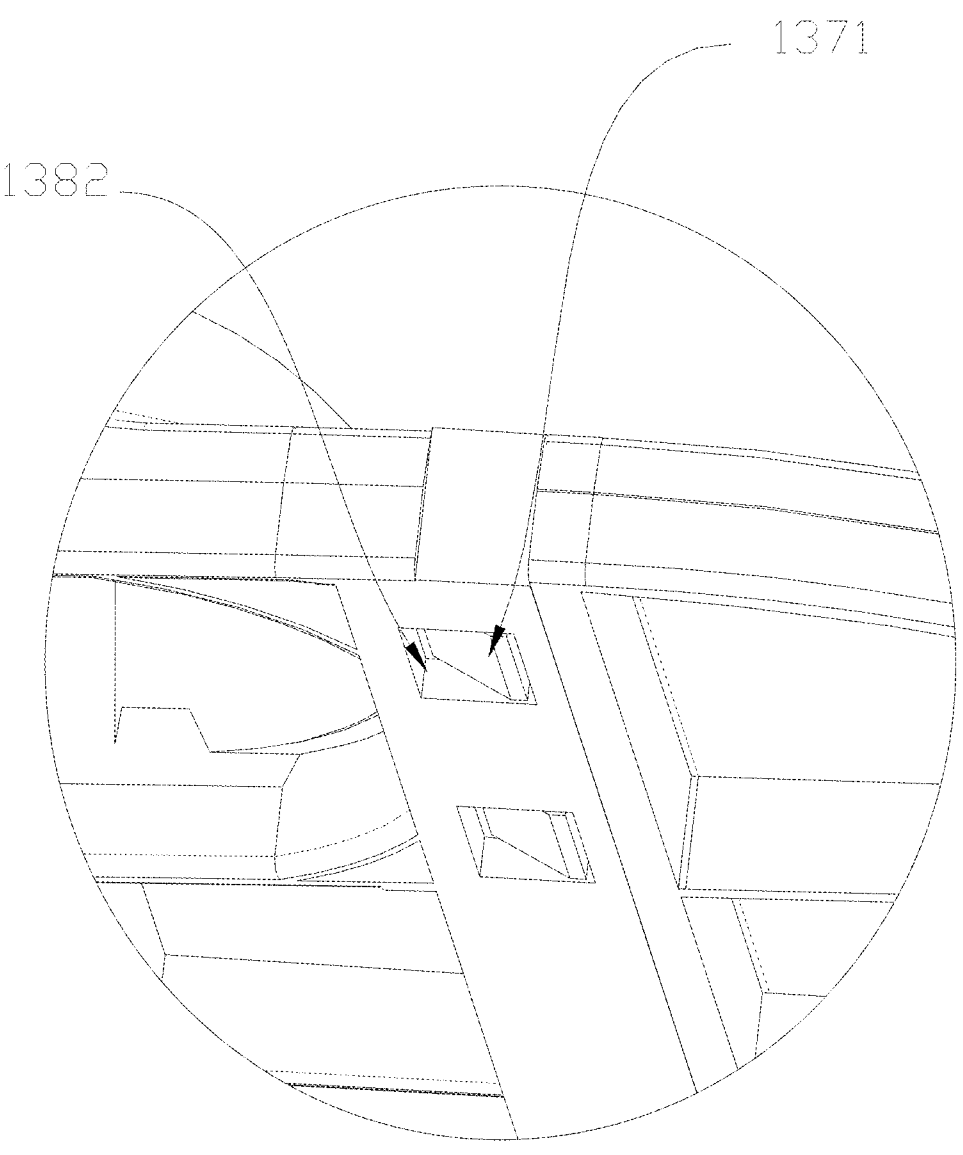
FIG. 23 is an enlarged view of part E in FIG. 22.

Referring to FIG. 17 to FIG. 19, this embodiment provides a bath stand with a structure that is basically consistent with the structure in Embodiment I. A difference lies in the base plate connection structure 13.

Specifically, in this embodiment, the base plate main body 11 has a first connection surface 113 connected to the base plate extension part 12, and the base plate extension part 12 has a second connection surface 123 connected to the first connection surface 113. The base plate connection structure 13 includes a first insertion block 135 that is arranged on the first connection surface 113 or the second connection surface 123 and protrudes outwards. A first limiting block 1351 is arranged on a front side wall of the first insertion block 135. The base plate connection structure 13 further includes a first connection and mounting strip 136 arranged on the first connection surface 113 or the second connection surface 123. The first connection and mounting strip 136 is provided with a first insertion slot 1361 that is recessed upwards from a bottom. A first limiting hole 1132 that corresponds to and is communicated with the first insertion slot is provided in the first connection surface 113. The first insertion block 135 is in insertion fit with the first insertion slot 1361 in a manner of being inserted up and down. When the first insertion block 135 is inserted into the first insertion slot 1361, the first limiting block 1351 passes through the first limiting hole 1132 to limit longitudinal movements of the base plate main body 11 and the base plate extension part 12. A width of the first insertion block 135 gradually decreases from one end to another end opposite to the end. A shape of the first insertion slot 1361 is matched with the first insertion block 135. The first insertion block 135 is inserted into the first insertion slot 1361 to limit lateral movements of the base plate main body 11 and the base plate extension part 12.

Through the above structure, the base plate extension part 12 and the base plate main body 11 can be effectively assembled and disassembled through the first insertion block 135 and the first insertion slot 1361 that are inserted from bottom to top. Furthermore, by limiting fit between the first limiting block 1351 on the front side wall of the first insertion block 135 and the first limiting hole 1132, and shape limiting fit between the first insertion block 135 and the first insertion slot 1361, the base plate extension part 12 can be stably limited inside the base plate main body 1. The structural design is convenient and simple. It is convenient for removal and mounting, and the mounting efficiency is improved.

Embodiment IV

Referring to FIG. 20 to FIG. 23, this embodiment provides a bath stand with a structure that is basically consistent with the structure in Embodiment I. A difference lies in the base plate connection structure 13.

Specifically, in this embodiment, the base plate main body 11 has a first connection surface 113 connected to the base plate extension part 12, and the base plate extension part 12 has a second connection surface 123 connected to the first connection surface 113. The base plate connection structure 13 includes a second insertion block 137 that is arranged on the first connection surface 113 or the second connection surface 123 and protrudes outwards. A second limiting block 1371 is arranged on a lower surface of the second insertion block 137. The base plate connection structure 13 further includes a second connection mounting strip 138 arranged on the first connection surface 113 or the second connection surface 123. The second connection mounting strip 138 has a second insertion slot 1381 with an opening facing the second connection surface 123. A second limiting hole 1382 communicated with the second insertion slot 1381 is further provided in a bottom of the second connection mounting strip 138. The second insertion block 137 is in insertion fit with the second insertion slot 1381 in a manner of being inserted front and back. When the second insertion block 137 is inserted into the second insertion slot 1381, the second limiting block 1371 passes through the second limiting hole 1382 to limit lateral movements of the base plate main body 11 and the base plate extension part 12.

Through the above structure, the base plate extension part 12 and the base plate main body 11 can be effectively assembled and disassembled through the second insertion block 137 and the second insertion slot 1381 that are inserted from front to back. Furthermore, by limiting fit between the second limiting block 1371 on the lower surface of the second insertion block 137 and the second limiting hole 1382, the base plate extension part 12 can be stably limited inside the base plate main body 1. The structural design is convenient and simple. It is convenient for removal and mounting, and the mounting efficiency is improved.

Embodiment V

Figure 24:
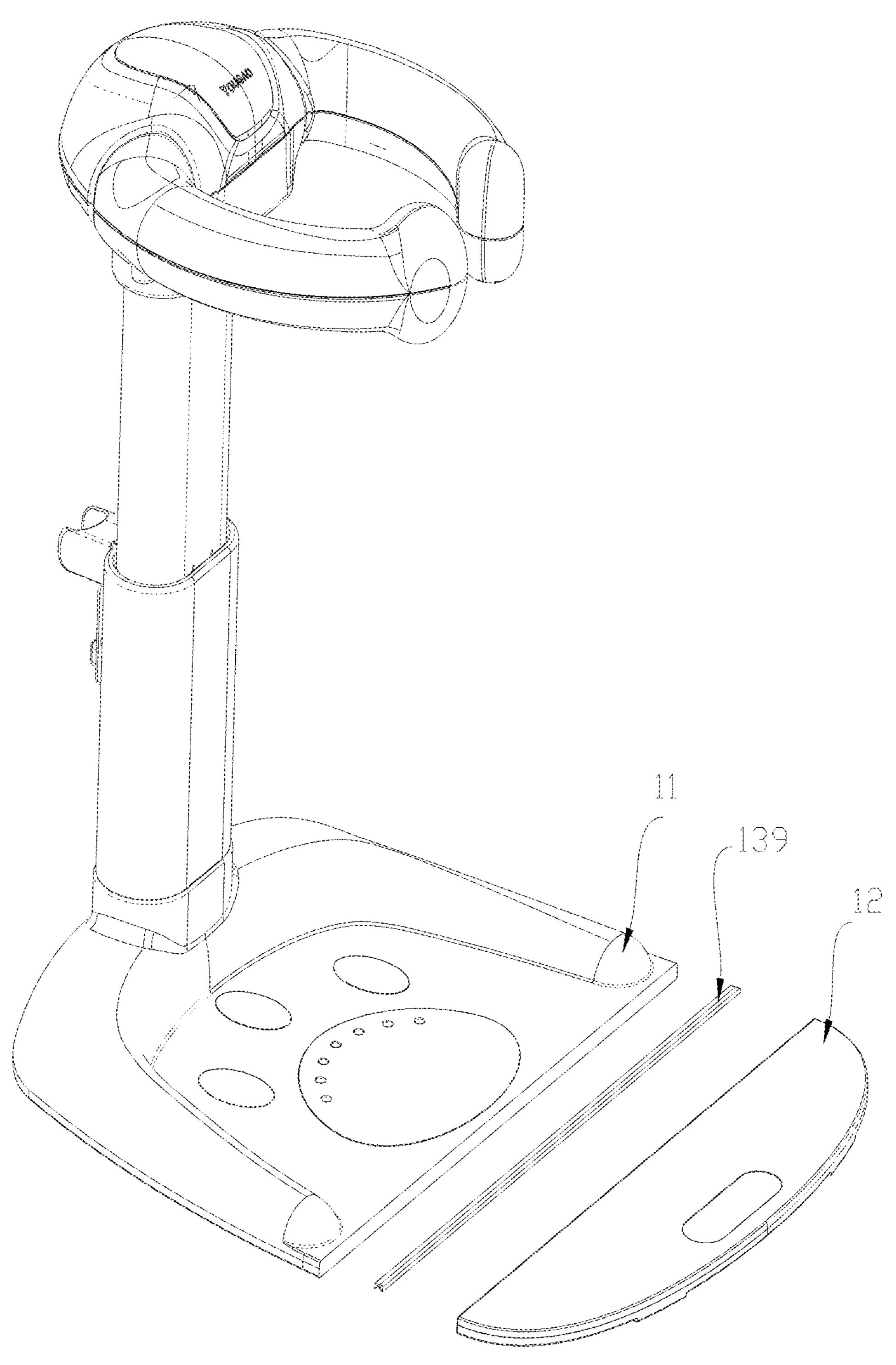
FIG. 24 is an exploded diagram of a base plate main body and a base plate extension part according to Embodiment V of the present invention.
Figure 25:
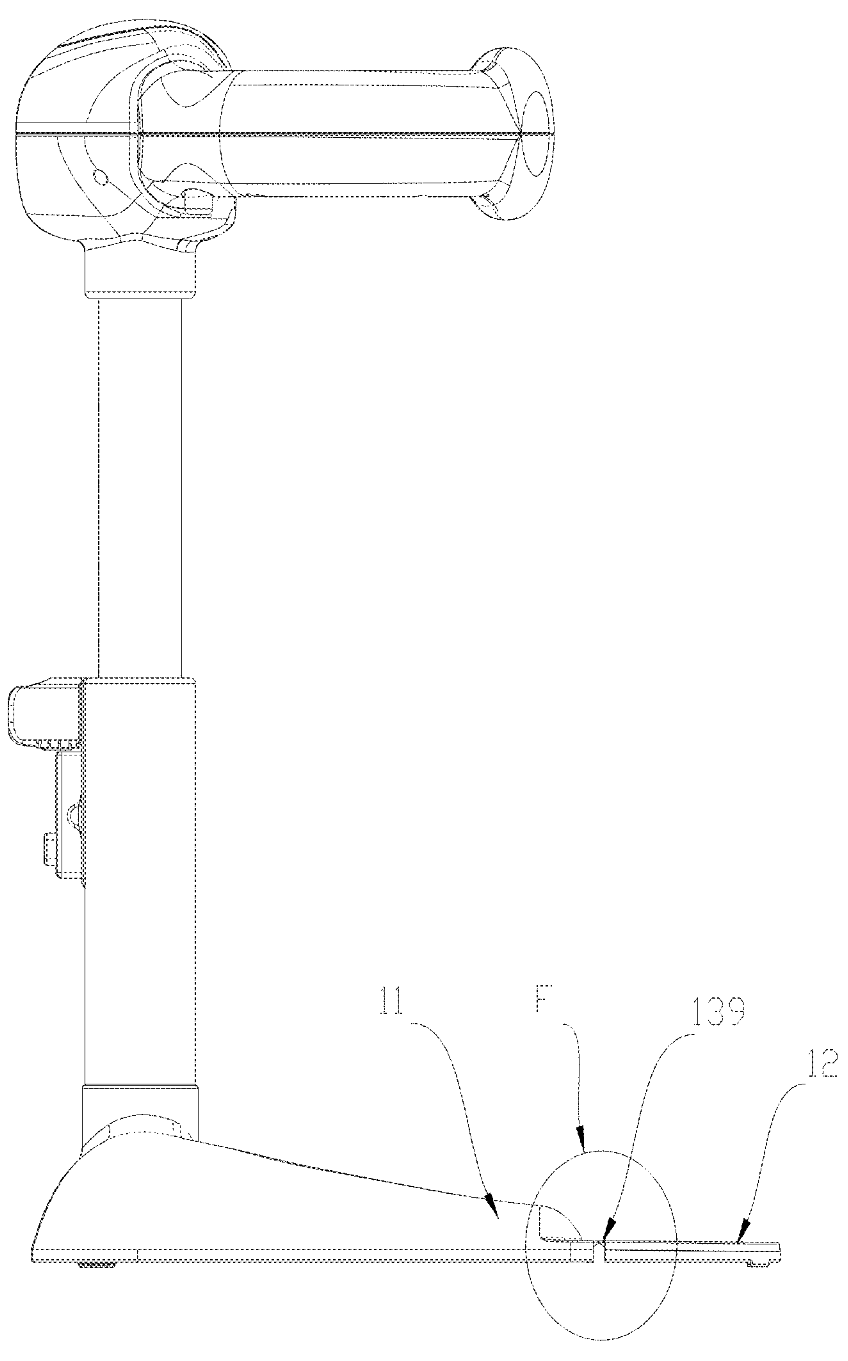
FIG. 25 is a side view according to Embodiment V of the present invention.
Figure 26:
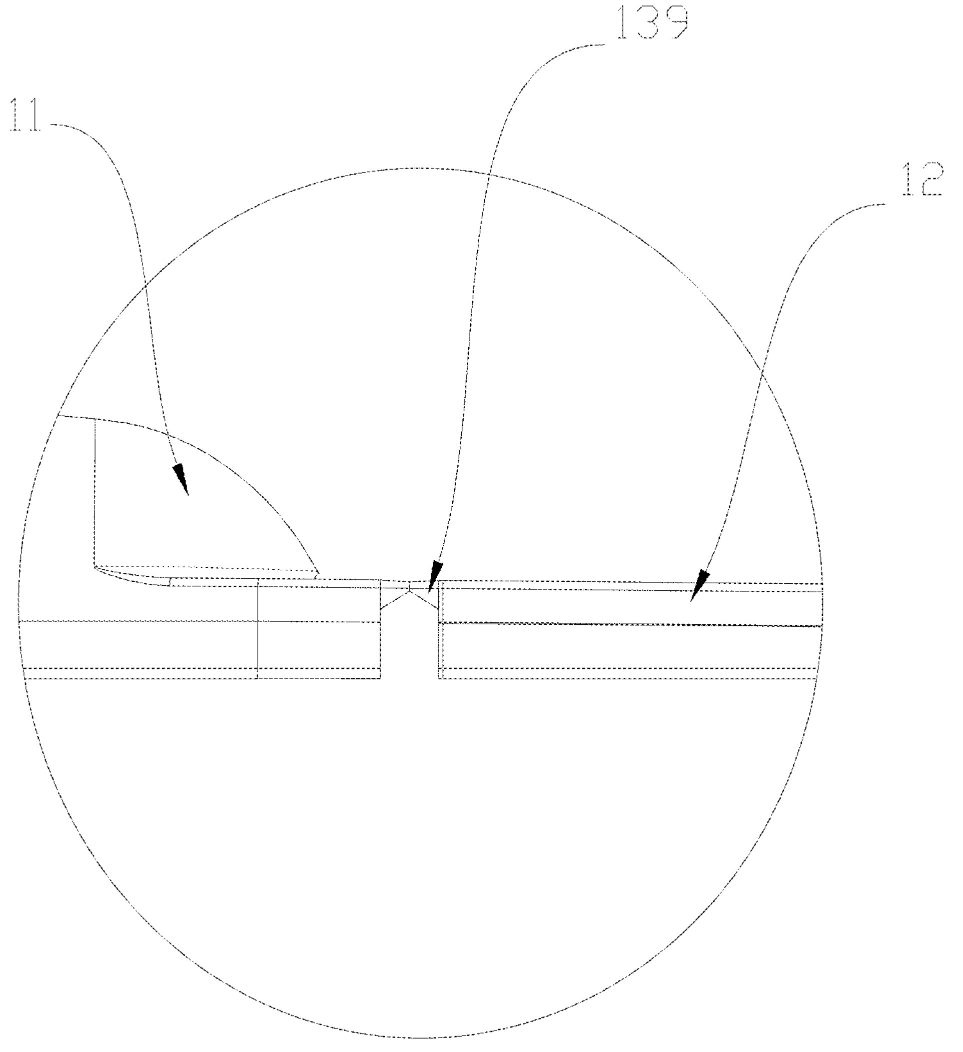
FIG. 26 is an enlarged view of part F in FIG. 25.
Figure 27:
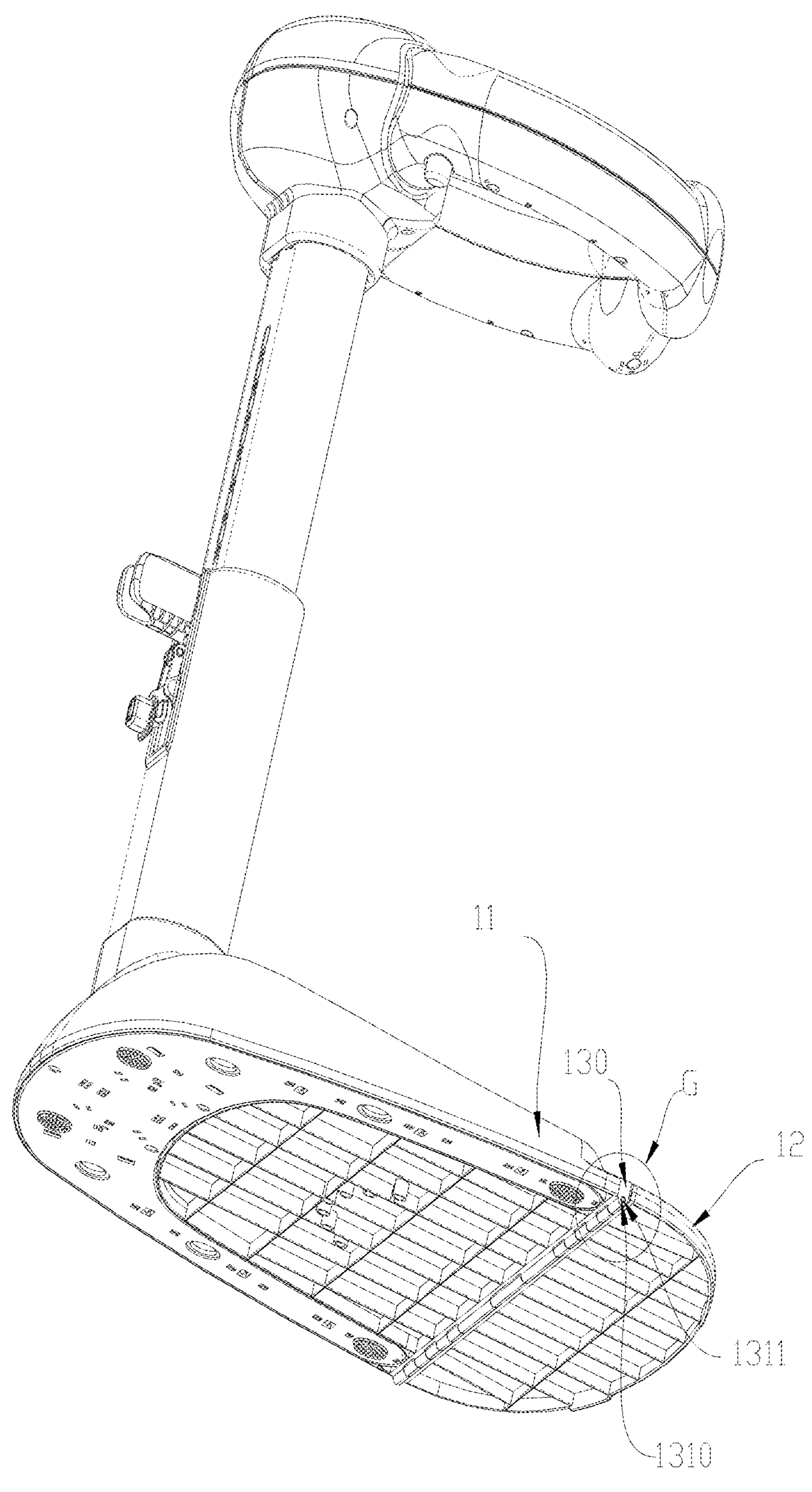
FIG. 27 is a schematic structural diagram of a bottom view according to Embodiment VI of the present invention.
Figure 28:
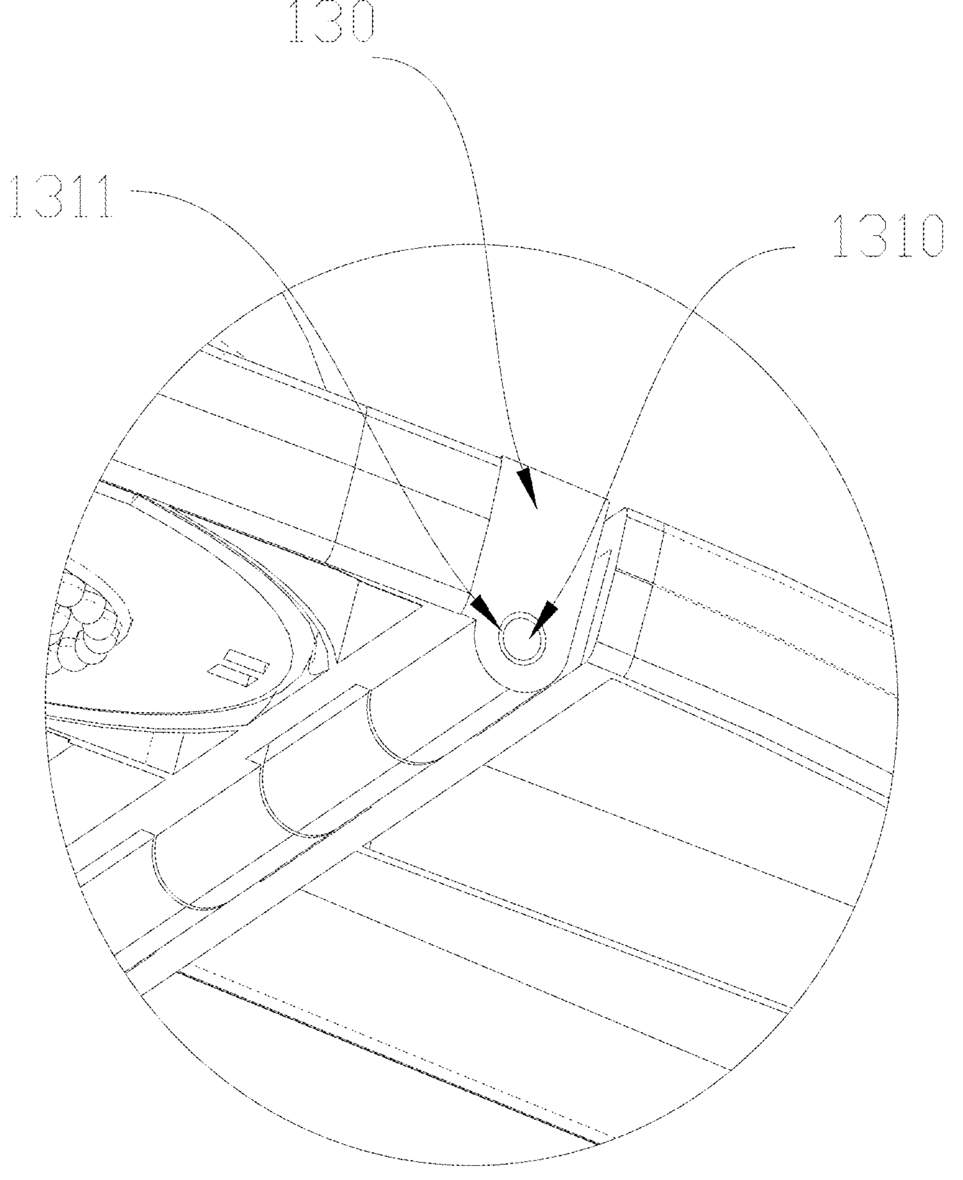
FIG. 28 is an enlarged view of part G in FIG. 27.
Figure 29:
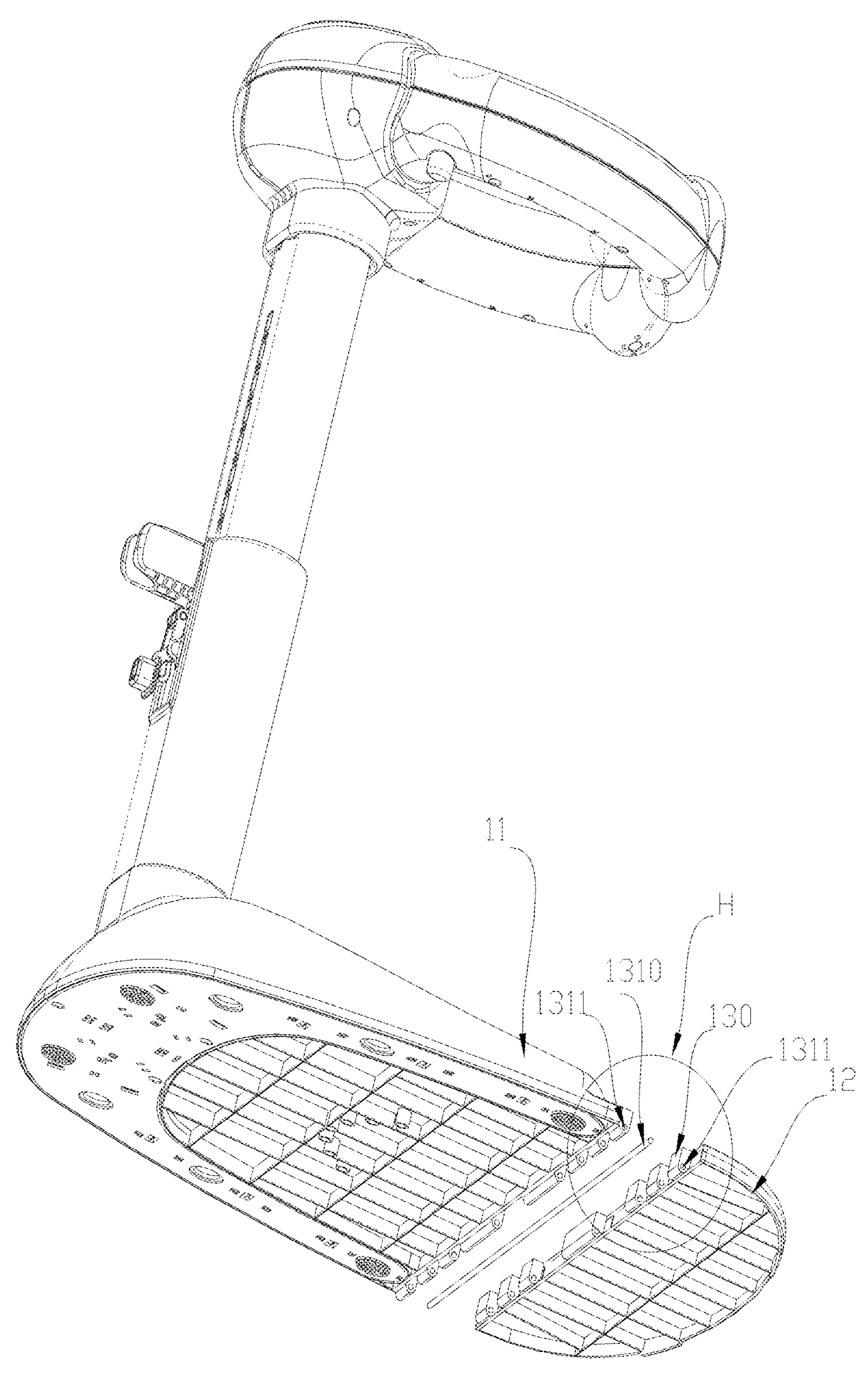
FIG. 29 is an exploded diagram of a base plate main body and a base plate extension part according to Embodiment VI of the present invention.
Figure 30:
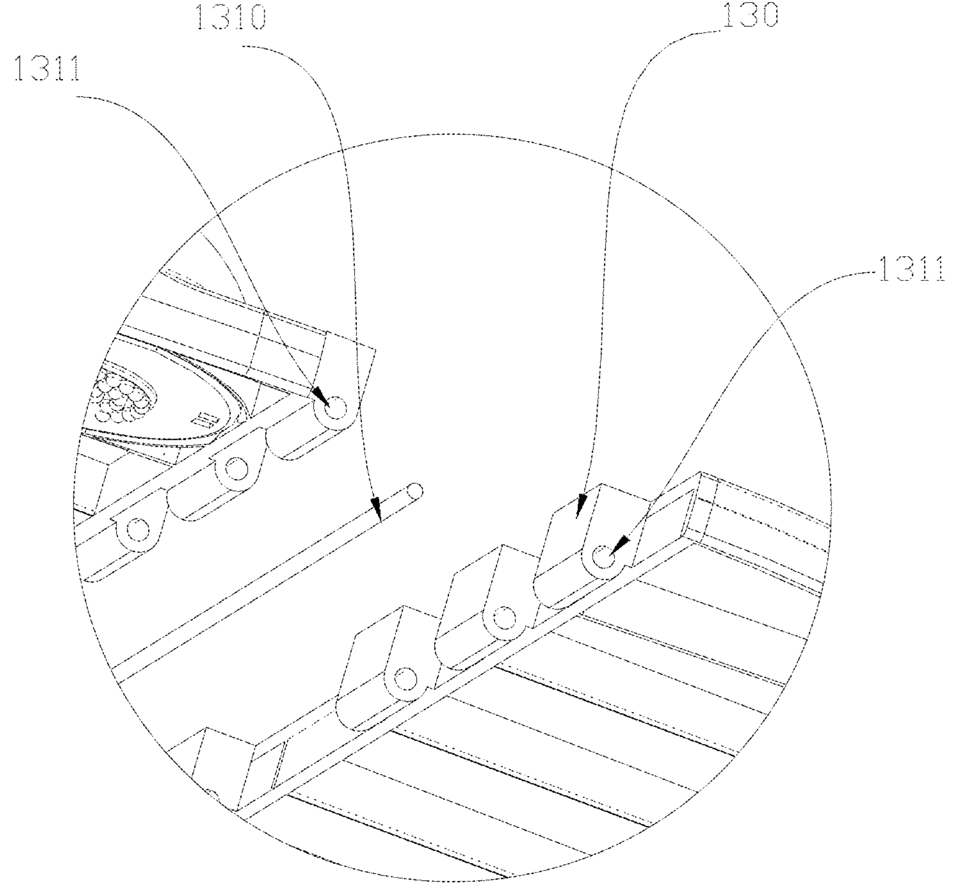
FIG. 30 is an enlarged view of part H in FIG. 29.
Figure 31:
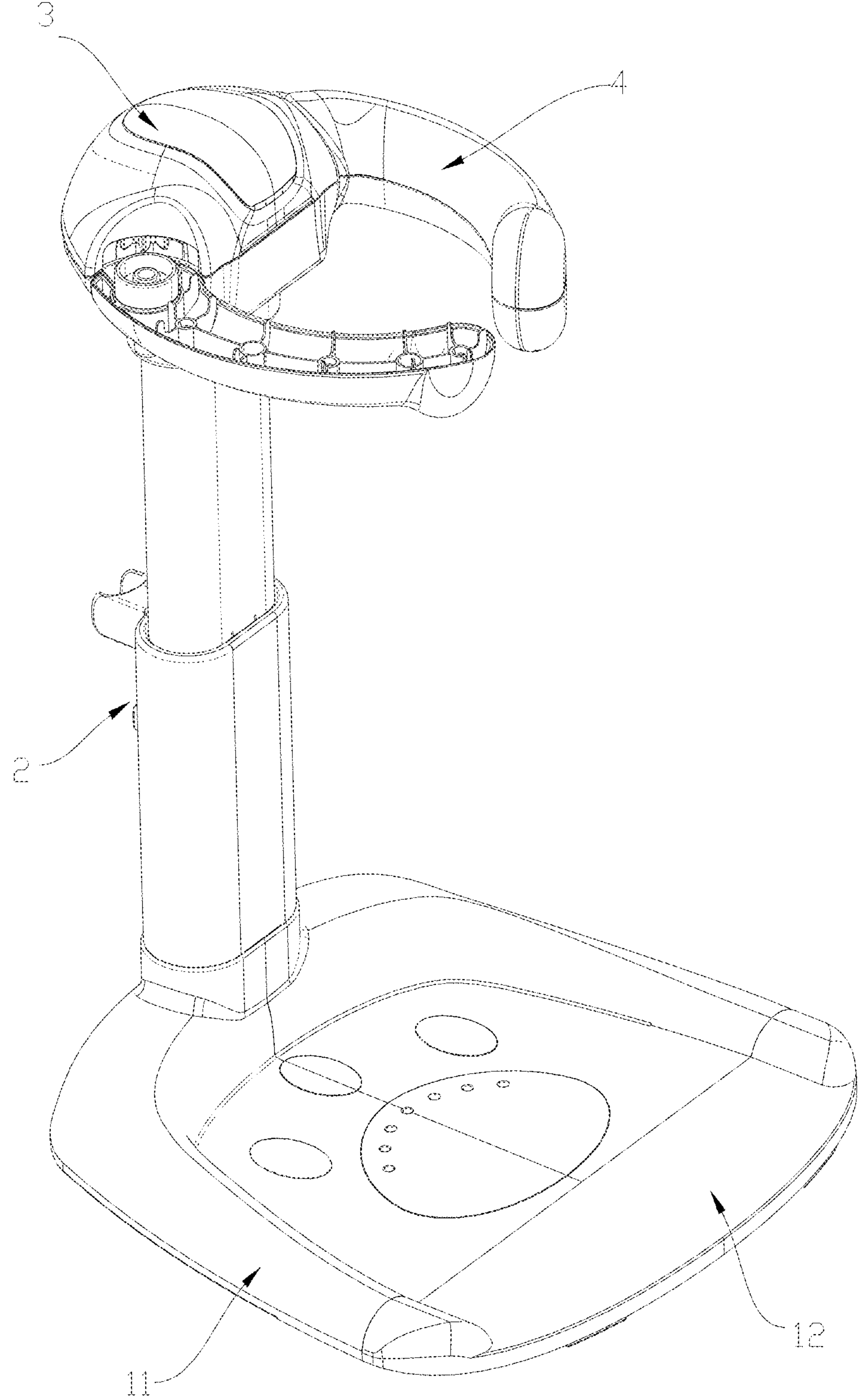
FIG. 31 is a perspective view of an Embodiment VII of the present disclosure.
Figure 32:
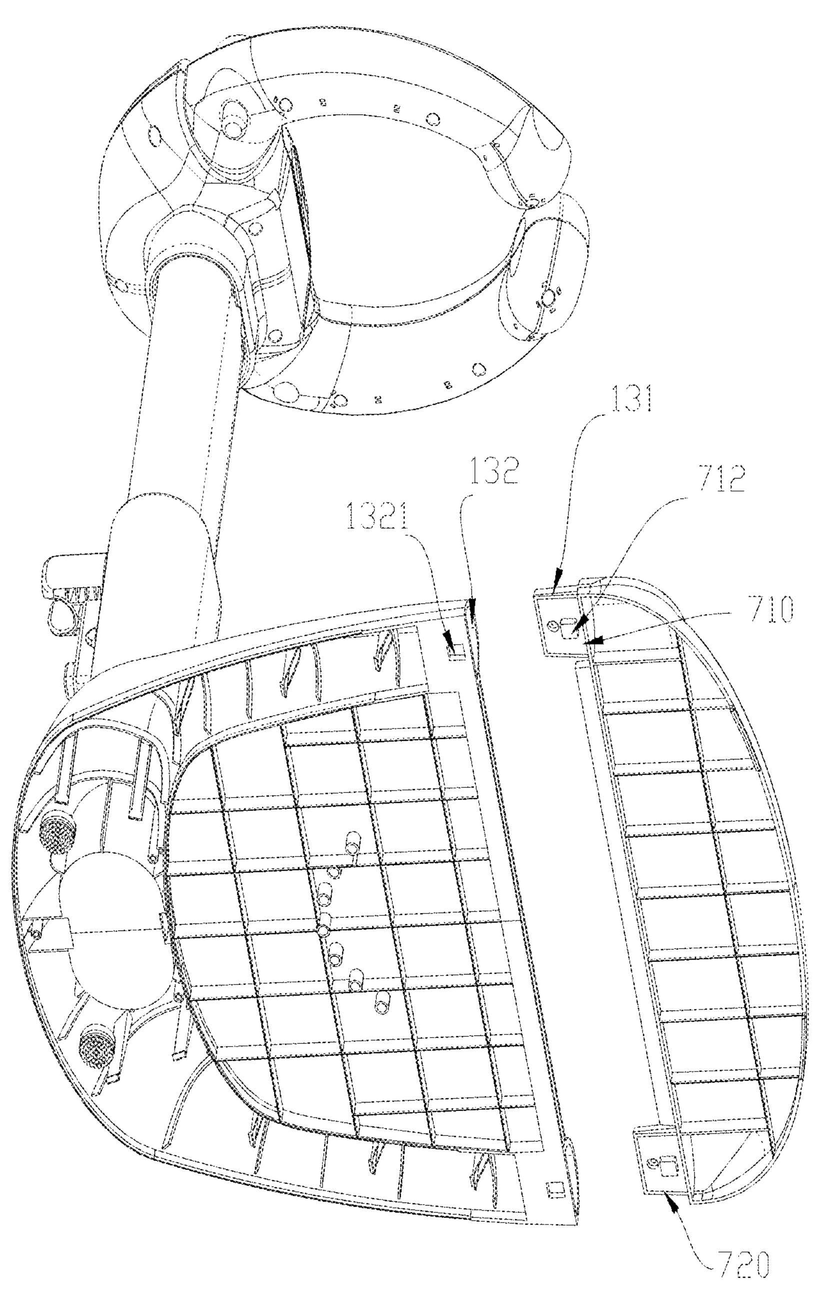
FIG. 32 is a schematic diagram of a base plate main body and a base plate extension part separated from each other according to Embodiment VII of the present disclosure.
Figure 33:
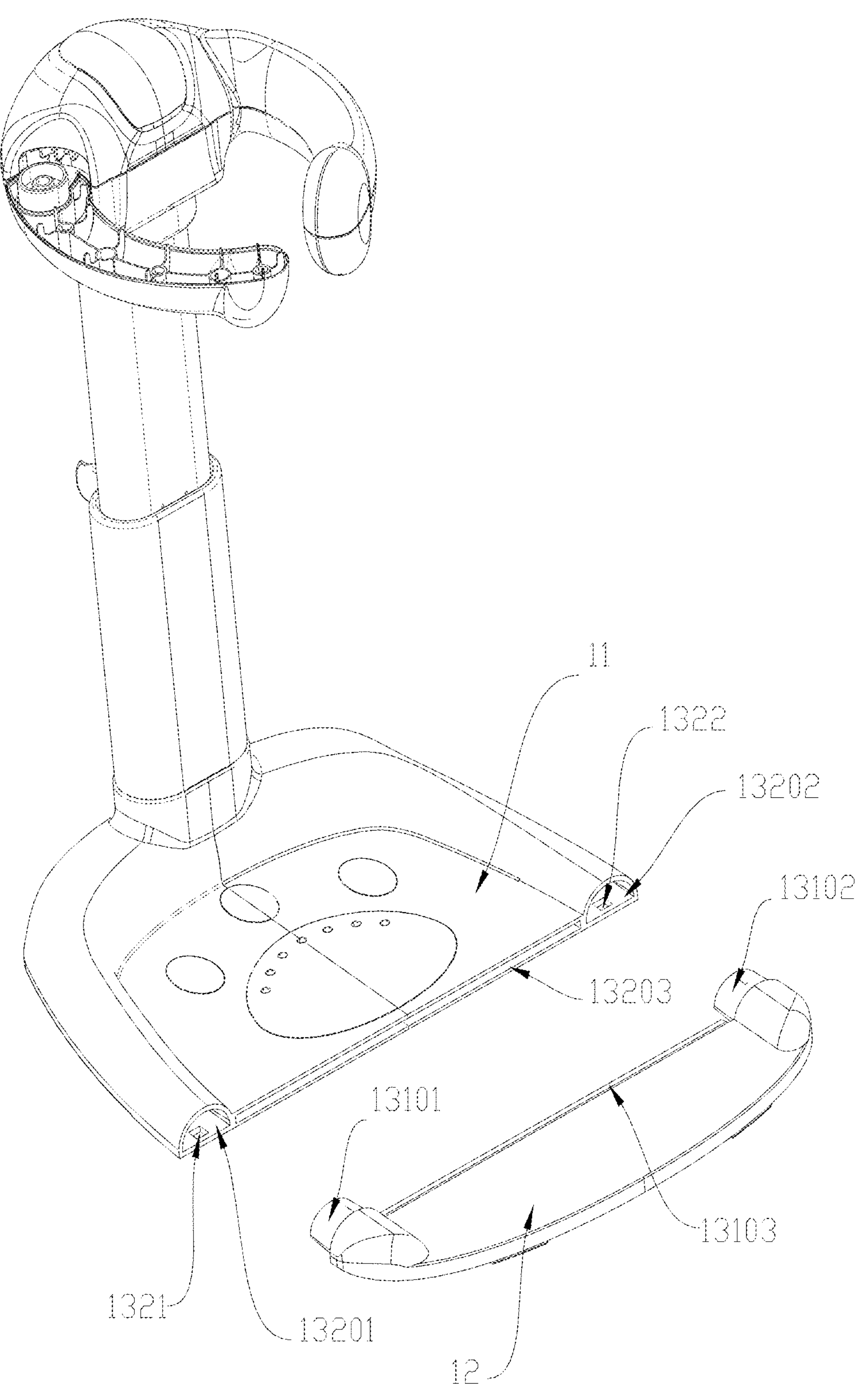
FIG. 33 is another schematic diagram of the base plate main body and the base plate extension part separated from each other according to Embodiment VII of the present disclosure.
Figure 34:
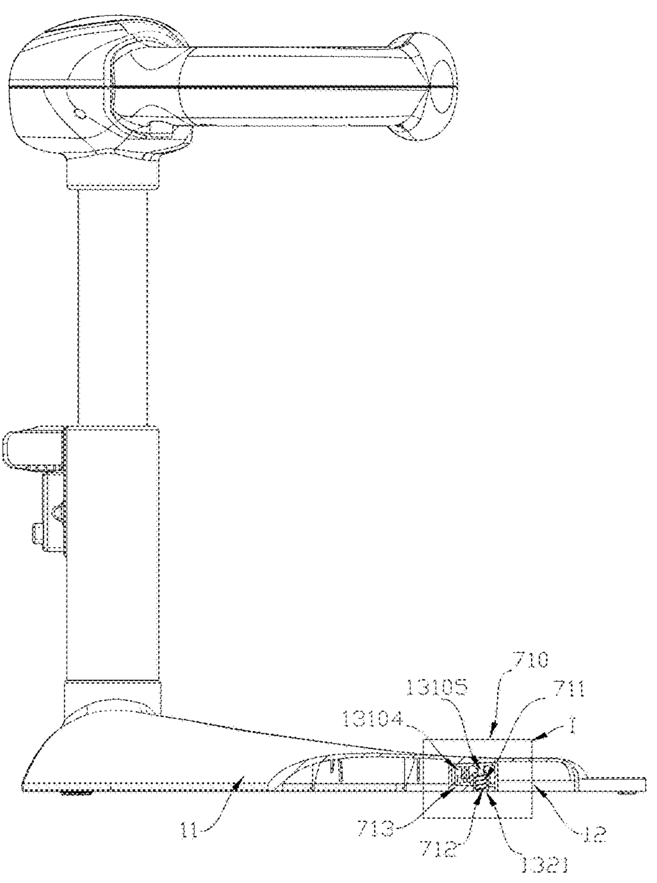
FIG. 34 is a cross-sectional view taken along a first elastic pressing member according to Embodiment VII of the present disclosure.
Figure 35:
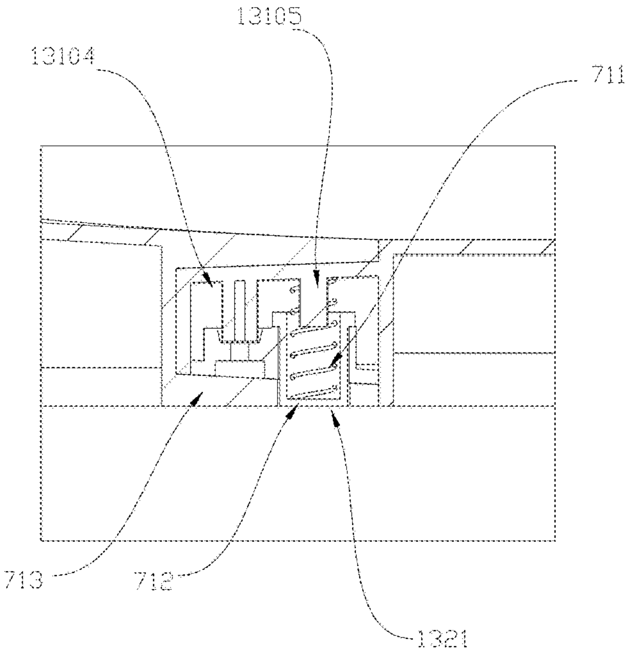
FIG. 35 is an enlarged view of part I in FIG. 34.
Figure 36:
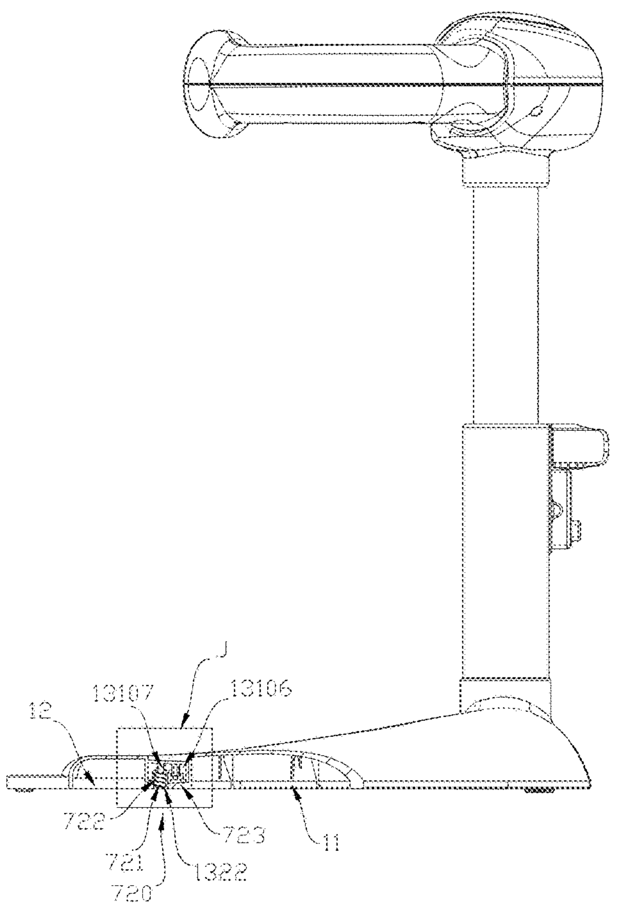
FIG. 36 is a cross-sectional view taken along a second elastic pressing member of Embodiment VII of the present disclosure.
Figure 37:
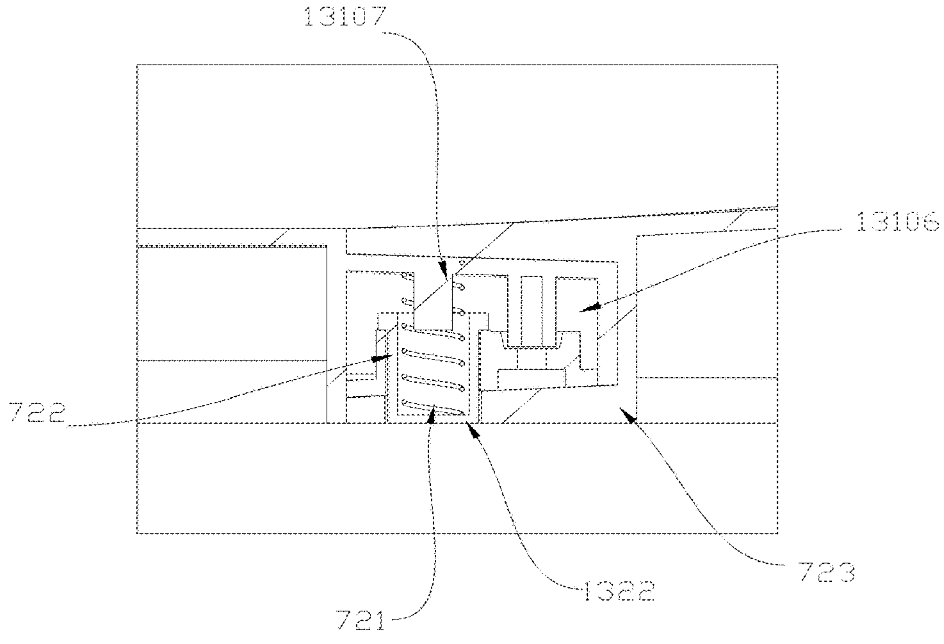
FIG. 37 is an enlarged view of part J of FIG. 36.
Figure 38:
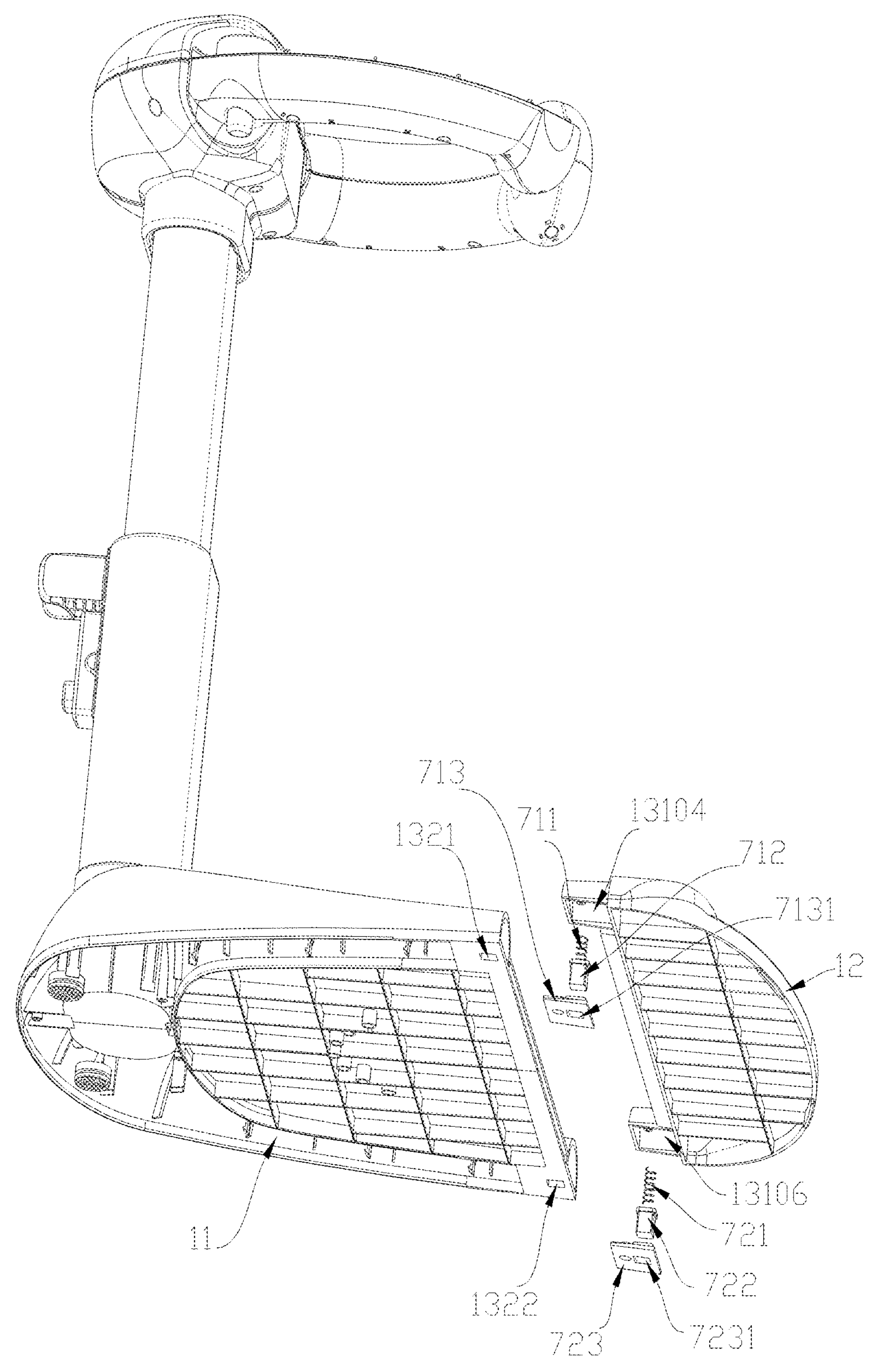
FIG. 38 is an exploded view of a first elastic pressing member and the second elastic pressing member according to Embodiment VII of the present disclosure.

Referring to FIG. 24 to FIG. 26, this embodiment provides a bath stand with a structure that is basically consistent with the structure in Embodiment I. A difference lies in the base plate connection structure 13.

Specifically, in this embodiment, the base plate connection structure 13 is configured to movably connect the base plate extension part 12 with the base plate main body 11.

In this embodiment, the base plate extension part 12 is rotatably connected to the base plate main body 11. The base plate connection structure 13 includes a flexible connector 139 arranged between the base plate extension part 12 and the base plate main body 11. The base plate extension part 12 and the base plate main body 11 are rotatably connected through the flexible connector 139. The flexible connector 139 is a flexible connection strip. A thickness of the flexible connection strip gradually increases from a middle part towards two sides.

Through the above structure, the arrangement of the flexible connector effectively implements rotatable connection between the base plate main body 11 and the base plate extension part 12. During daily use, a floor on which the bath stand is placed is rough. In this case, angles of the base plate main body 11 and the base plate extension part 12 are adjusted through the flexible connector 139, so that the bath stand can be steadily placed on the rough floor. The flexible connection strip can be made of silicone, rubber, and plastic, without limitation.

Embodiment VI

Referring to FIG. 27 to FIG. 30, this embodiment provides a bath stand with a structure that is basically consistent with the structure in Embodiment I. A difference lies in the base plate connection structure 13.

Specifically, in this embodiment, the base plate connection structure 13 is configured to rotatably connect the base plate extension part 12 with the base plate main body 11. A rotation resisting assembly 130 for resisting continuous rotation of the base plate extension part 12 when the base plate extension part 12 is rotated to be unfolded to a preset angle relative to the base plate main body 11 is further arranged between the base plate extension part 12 and the base plate main body 11. The base plate connection structure 13 includes rotatable connection holes 1311 respectively provided in the base plate main body 11 and the base plate extension part 12, and rotatable connection shaft pins 1310 simultaneously threaded into the rotatable connection holes 1311 in the base plate main body 11 and the base plate extension part 12.

Through the above structure, the cooperative use of the rotatable connection shaft pins 1310 and the rotatable connection holes 1311 effectively implements rotatable connection between the base plate main body 11 and the base plate extension part 12, so that a rotation angle between the base plate extension part 12 and the base plate main body 11 can be adjusted more smoothly and accurately, and the multifunctionality and convenience of the bath stand are greatly improved.

Embodiment VII

Referring to FIG. 31 to FIG. 38, the present embodiment provides a bath stand, which is basically identical in structure to the bath stand of Embodiment I. The bath stand according to the present embodiment differs from that of Embodiment 1 in the base plate connection structure 13 and the limiting and stop structure 7.

Specifically, in the present embodiment, the limiting and stop structure 7 includes a first elastic pressing member 710 provided on the base plate insertion protrusion 131. The first elastic pressing member 710 includes a first spring 711 and a first pressing housing 712 abutting against the first spring 711. The base plate insertion recess 132 defines a first engaging slot 1321 matching the first pressing housing 712. When the base plate insertion protrusion 131 is inserted into the base plate insertion recess 132, press the first pressing housing 712 to compress the first spring 711, and the first pressing housing 712 is movable within the base plate insertion recess 132. When the first pressing housing 712 is moved to be aligned with the first engaging slot 1321, a restoring force generated by the first spring 711 can push the first pressing housing 712 to be engaged in the first engaging slot 1321, so as to prevent the base plate insertion recess 132 from being separated from the base plate insertion protrusion 131. The first pressing housing 712 is pressed again to disengage the first pressing housing 712 from the first engaging slot 1321 to separate the base plate insertion recess 132 from the base plate insertion protrusion 131. Through the above structure, the elastic engagement between the first pressing housing 712 and the first engaging slot 1321 enables the quick connection and detachment of the base plate insertion recess 132 and the base plate insertion protrusion 131 through the first pressing housing 712. The structural design is simple and ingenious, and the mounting efficiency is improved.

In the present embodiment, the base plate insertion protrusion 131 includes a first insertion protrusion 13101 and a second insertion protrusion 13102 provided at two ends of the base plate extension part 12. The base plate insertion recess 132 defines a first insertion groove 13201 and a second insertion groove 13202 at two ends of the base plate main body 11. The first insertion protrusion 13101 is inserted into the first insertion groove 13201, and the second insertion protrusion 13102 is inserted into the second insertion groove 13202 so that the base plate main body 11 is detachably connected to the base plate extension part 12.

Further, the first elastic pressing member 710 is provided in the first insertion protrusion 13101, and the first engaging slot 1321 is provided at a bottom portion of the first insertion groove 13201. The first elastic pressing member 710 includes the first spring 711 and the first pressing housing 712 abutting against the first spring 711. When the first insertion protrusion 13101 is inserted into the first insertion groove 13201, the first pressing housing 712 is pressed to compress the first spring 711, and the first pressing housing 712 is movable within the first insertion groove 13201. When the first pressing housing 712 is moved to be aligned with the first engaging slot 1321, a restoring force generated by the first spring 711 can push the first pressing housing 712 to be engaged in the first engaging slot 1321, so as to prevent the first insertion groove 13201 from separating from the first insertion protrusion 13101. The first pressing housing 712 is pressed again to separate the first pressing housing 712 from the first engaging slot 1321, so that the first insertion protrusion 13101 is separated from the first insertion groove 13201.

Further, the limiting and stop structure 7 further includes a second elastic pressing member 720 provided in the second insertion protrusion 13102. The second elastic pressing member 720 includes a second spring 721 and a second pressing housing 722 abutting against the second spring 721. A bottom portion of the second insertion groove 13202 defines a second engaging slot 1322 matching the second pressing housing 722. When the second insertion protrusion 13102 is inserted into the second insertion groove 13202, press the second pressing housing 722 to compress the second spring 721, and the second pressing housing 722 is movable in the second insertion groove 13202. When the second pressing housing 722 is moved to be aligned with the second engaging slot 1322, a restoring force generated by the second spring 721 is capable of pushing the second pressing housing 722 to be engaged in the second engaging slot 1322 to prevent the second insertion groove 13202 from being separated from the second insertion protrusion 13102. The second pressing housing 722 is pressed again, so that the second pressing housing 722 is separated from the second engaging slot 1322, so that the second insertion groove 13202 is separated from the second insertion protrusion 13102.

Through the above structure, through the elastic engagement of the first pressing housing 712 and the first engaging slot 1321, and the elastic engagement of the second pressing housing 722 and the second engaging slot 1322, the base plate main body 11 and the base plate extension part 12 can be quickly connected or disengaged by pressing the pressing housings, and the engagement structure at the two ends also reinforces the connection between the base plate main body 11 and the base plate extension part 12, ensuring the stability during connection.

In the present embodiment, the base plate insertion protrusion further includes an insertion protruding strip 13103 provided between the first insertion protrusion 13101 and the second insertion protrusion 13102, and the base plate insertion recess further defines a third insertion groove 13203 between the first insertion groove 13201 and the second insertion groove 13202. The first insertion protrusion 13101 can be inserted into the first insertion groove 13201, the insertion protruding strip 13103 can be inserted into the third insertion groove 13203, and the second insertion protrusion 13102 can be inserted into the second insertion groove 13202 so that the base plate main body 11 is detachably connected to the base plate extension part 12. Through the structure above, the configuration of the insertion protruding strip 13103 and the third insertion groove 13203 balances and stabilizes the connection between the base plate main body 11 and the base plate extension part 12.

In the present embodiment, the first insertion protrusion 13101 defines a first mounting cavity 13104 with an opening facing downward. A first mounting post 13105 extends out from a bottom portion of the first mounting cavity 13104. The first elastic pressing member 710 further includes a first limiting member 713. The first limiting member 713 is fixedly connected at the opening of the first mounting cavity 13104. The first limiting member 713 defines a first through hole 7131. The first pressing housing 712 is sleeved on the first mounting post 13105 via the first spring 711. The first pressing housing 712 is movable in the first through hole 7131. A bottom portion of the first pressing housing 712 abuts against the first limiting member 713 so as to limit the first pressing housing 712 from being separated from the first mounting cavity 13104.

Further, the second insertion protrusion 13102 defines a second mounting cavity 13106 with an opening facing downward, A second mounting post 13107 extends out from a bottom portion of the second mounting cavity 13106. The second elastic pressing member 720 further defines a second limiting member 723. The second limiting member 723 is fixedly connected at the opening of the second mounting cavity 13106. The second limiting member 723 defines a second through hole 7231. The second pressing housing 722 is sleeved on the second mounting post 13107 via the second spring 721. The second pressing housing 722 is movable in the second through hole 7231, and a bottom portion of the second pressing housing 722 abuts against the second limiting member 723 so as to limit the second pressing housing 722 from being separated from the second mounting cavity 13106. Through the above structure, the installation and arrangement of the first elastic pressing member 710 and the second elastic pressing member 720 is achieved, thereby enabling quick connection or detachment of the base plate main body 11 and the base plate extension part 12.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

The invention claimed is:

1. A bath stand, comprising:

a base plate, wherein the base plate comprises a base plate main body and a base plate extension part; a base plate connection structure for connecting the base plate extension part to the base plate main body is arranged between the base plate extension part and the base plate main body;

wherein the base plate connection structure is configured to detachably connect the base plate extension part with the base plate main body;

wherein the base plate connection structure comprises a base plate insertion protrusion arranged on the base plate main body or the base plate extension part, and a base plate insertion recess arranged on the base plate extension part or the base plate main body and is in insertion fit with the base plate insertion protrusion; the base plate insertion protrusion is in insertion fit with the base plate insertion recess, so that the base plate main body and the base plate extension part are detachably connected;

wherein a limiting and stop structure is arranged between the base plate insertion recess and the base plate insertion protrusion, and the limiting and stop structure is configured for preventing separation of the protrusion from the recess;

wherein the limiting and stop structure comprises a first elastic pressing member provided at the base plate insertion protrusion, the first elastic pressing member comprises a first spring and a first pressing housing abutting against the first spring, and the base plate insertion recess defines a first engaging slot matching the first pressing housing; when the base plate insertion protrusion is inserted into the base plate insertion recess, the first pressing housing is configured for being pressed to compress the first spring, and the first pressing housing is movable in the base plate insertion recess; when the first pressing housing is moved to be aligned with the first engaging slot, a restoring force generated by the first spring can push the first pressing housing to be engaged within the first engaging slot, so as to prevent the base plate insertion recess from being separated from the base plate insertion protrusion; the first pressing housing is pressed again to separate the first pressing housing from the first engaging slot, so that the base plate insertion recess is separated from the base plate insertion protrusion.

2. The bath stand according to claim 1, wherein the bath stand further comprises a connecting base, wherein the connecting base is located above the base plate; a supporting assembly is arranged between the connecting base and the base plate to space the base plate apart from the connecting base vertically; a lower end of the supporting assembly is connected to the base plate; and an upper end of the supporting assembly is connected to the connecting base.

3. The bath stand according to claim 2, wherein the lower end of the supporting assembly is detachably connected to the base plate, and the upper end of the supporting assembly is detachably connected to the connecting base.

4. The bath stand according to claim 2, wherein the bath stand further comprises two armrests; end portions of the armrests are connected to the connecting base; the end portions of the armrests are rotatably connected to the connecting base; the two armrests are able to move towards each other to be closed or move away from each other to be opened relative to the connecting base.

5. The bath stand according to claim 4, wherein the connecting base is provided with an armrest linkage mechanism for connecting the two armrests in a linkage manner; an armrest locking mechanism for locking the armrest relative to the connecting base is arranged between at least one of the armrests and the connecting base; the armrest locking mechanism is configured to allow the armrest to be adjusted in a plurality of angles relative to the connecting base.

6. The bath stand according to claim 5, wherein the connecting base is provided with an outer connecting cylinder; an inner connecting cylinder that is rotatably inserted into the outer connecting cylinder is arranged at an end portion of the armrest; the armrest locking mechanism comprises armrest locking grooves provided in an inner side of the outer connecting cylinder in a circumferential spacing manner, and an armrest locking sliding rod that is threaded into the inner connecting cylinder in a manner of sliding up and down; an armrest locking convex ring is arranged at an upper part of the armrest locking sliding rod; armrest locking convex teeth that are in locking fit with the armrest locking grooves are arranged on a lower surface of the armrest locking convex ring in a circumferential spacing manner; and the armrest locking mechanism further comprises a sliding rod reset elastic member for driving the armrest locking sliding rod to be elastically reset.

7. The bath stand according to claim 1, wherein the base plate main body has a first hollow slot in a bottom; a first reinforcing rib is arranged inside the first hollow slot; the base plate extension part has a second hollow slot in a bottom; and a second reinforcing rib is arranged inside the second hollow slot.

8. The bath stand according to claim 1, wherein the supporting assembly comprises a lower supporting rod, a lower end of which is detachably connected to the base plate, and an upper supporting rod, a lower end of which is connected to the lower supporting rod in a telescopically adjustable manner; an upper end of the upper supporting rod is detachably connected to the connecting base; an adjustment locking mechanism and an adjustment unlocking mechanism for linking an unlocking action of the adjustment locking mechanism are arranged between the upper supporting rod and the lower supporting rod; the adjustment locking mechanism comprises a plurality of adjustment locking holes that are provided in the upper supporting rod and are spaced apart in a length direction of the upper supporting rod, and an adjustment locking block that is slidably arranged on the lower supporting rod and capable of being inserted into the corresponding adjustment locking holes to lock the upper supporting rod relative to the lower supporting rod; a locking block reset elastic member for driving the adjustment locking block to be elastically reset is arranged between the adjustment locking block and the lower supporting rod; and the adjustment locking block is configured to be linked with an unlocking action by the adjustment unlocking mechanism.

9. A bath stand, comprising:

a base plate, wherein the base plate comprises a base plate main body and a base plate extension part; a base plate connection structure for connecting the base plate extension part to the base plate main body is arranged between the base plate extension part and the base plate main body;

wherein the base plate connection structure is configured to detachably connect the base plate extension part with the base plate main body;

wherein the base plate connection structure comprises a base plate insertion protrusion arranged on the base plate main body or the base plate extension part, and a base plate insertion recess arranged on the base plate extension part or the base plate main body and is in insertion fit with the base plate insertion protrusion; the base plate insertion protrusion is in insertion fit with the base plate insertion recess, so that the base plate main body and the base plate extension part are detachably connected;

wherein a limiting and stop structure is arranged between the base plate insertion recess and the base plate insertion protrusion, and the limiting and stop structure is configured for preventing separation of the protrusion from the recess;

wherein the base plate insertion protrusion comprises a first insertion protrusion and a second insertion protrusion provided at two ends of the base plate extension part, and the base plate insertion recess comprises a first insertion groove and a second insertion groove defined at two ends of the base plate main body; the first insertion protrusion is configured for inserting into the first insertion groove, and the second insertion protrusion is configured for inserting into the second insertion groove, so that the base plate main body is detachably connected to the base plate extension part.

10. The bath stand according to claim 9, wherein the first elastic pressing member is provided in the first insertion protrusion, and the first engaging slot is provided at a bottom portion of the first insertion groove; the first elastic pressing member comprises a first spring and a first pressing housing abutting against the first spring; when the first insertion protrusion is inserted into the first insertion groove, the first pressing housing is pressed to compress the first spring, and the first pressing housing is movable in the first insertion groove; 11, when the first pressing housing is moved to be aligned with the first engaging slot, a restoring force generated by the first spring can push the first pressing housing to be engaged within the first engaging slot, so as to prevent the first insertion groove from being separated from the first insertion protrusion; the first pressing housing is pressed again to separate the first pressing housing from the first engaging slot, so that the first insertion protrusion is separated from the first insertion groove.

11. The bath stand according to claim 10, wherein the first insertion protrusion defines a first mounting cavity with an opening facing downward, a first mounting post extends out from a bottom portion of the first mounting cavity, the first elastic pressing member further comprises a first limiting member, the first limiting member is fixedly connected at the opening of the first mounting cavity, and the first limiting member defines a first through hole; the first pressing housing is sleeved on the first mounting post via the first spring, the first pressing housing is movable in the first through hole, and a bottom portion of the first pressing housing abuts against the first limiting member to limit the first pressing housing from being separated from the first mounting cavity.

12. The bath stand according to claim 9, wherein the limiting and stop structure further comprises a second elastic pressing member provided in the second insertion protrusion, the second elastic pressing member comprises a second spring and a second pressing housing abutting against the second spring, and a bottom portion of the second insertion groove defines a second engaging slot matching the second pressing housing; when the second insertion protrusion is inserted into the second insertion groove, the second pressing housing is pressed to compress the second spring, and the second pressing housing is movable in the second insertion groove; when the second pressing housing is moved to be aligned with the second engaging slot, a restoring force generated by the second spring is capable of pushing the second pressing housing to be engaged in the second engaging slot, so as to prevent the second insertion groove from being separated from the second insertion protrusion; the second pressing housing is pressed again to separate the second pressing housing from the second engaging slot, so that the second insertion groove is separated from the second insertion protrusion.

13. The bath stand according to claim 12, wherein the second insertion protrusion defines a second mounting cavity with an opening facing downward, a second mounting post extends out from a bottom portion of the second mounting cavity, the second elastic pressing member further comprises a second limiting member, the second limiting member is fixedly connected at the opening of the second mounting cavity, and the second limiting member defines a second through hole; the second pressing housing is sleeved on the second mounting post via the second spring, the second pressing housing is movable in the second through hole, and a bottom portion of the second pressing housing abuts against the second limiting member to limit the second pressing housing from being separated from the second mounting cavity.

14. The bath stand according to claim 13, wherein the limiting and stop structure for preventing rotation of the armrest locking sliding rod is arranged between an outer wall of the armrest locking sliding rod and a side wall of the inner connecting cylinder; the limiting and stop structure comprises a stop and limiting slot arranged on the side wall of the inner connecting cylinder, and a stop and limiting block arranged on the outer wall of the armrest locking sliding rod and threaded in the stop and limiting slot.

15. The bath stand according to claim 9, wherein the base plate insertion protrusion further comprises an insertion protruding strip provided between the first insertion protrusion and the second insertion protrusion, and the base plate insertion recess further comprises a third insertion groove defined between the first insertion groove and the second insertion groove; the first insertion protrusion is configured for inserting into the first insertion groove, the insertion protruding strip is configured for inserting into the third insertion groove, and the second insertion protrusion is configured for inserting into the second insertion groove, so that the base plate main body is detachably connected to the base plate extension part.

16. The bath stand according to claim 15, wherein the armrest linkage mechanism comprises armrest teeth respectively arranged on the corresponding end portions of the two armrests, and a linkage gear that is rotatably arranged on the connecting base and is in meshing drive with the armrest teeth.

* * * * *